US011600270B2

(12) United States Patent
Yamagishi

(10) Patent No.: US 11,600,270 B2
(45) Date of Patent: Mar. 7, 2023

(54) INFORMATION PROCESSING APPARATUS AND INFORMATION PROCESSING METHOD

(71) Applicant: SATURN LICENSING LLC, New York, NY (US)

(72) Inventor: Yasuaki Yamagishi, Kanagawa (JP)

(73) Assignee: Saturn Licensing LLC, New York, NY (US)

(*) Notice: Subject to any disclaimer, the term of this patent is extended or adjusted under 35 U.S.C. 154(b) by 226 days.

(21) Appl. No.: 16/645,058

(22) PCT Filed: Aug. 31, 2018

(86) PCT No.: PCT/JP2018/032323
§ 371 (c)(1),
(2) Date: Mar. 6, 2020

(87) PCT Pub. No.: WO2019/054199
PCT Pub. Date: Mar. 21, 2019

(65) Prior Publication Data
US 2020/0211549 A1 Jul. 2, 2020

(30) Foreign Application Priority Data

Sep. 15, 2017 (JP) .............................. JP2017-177754

(51) Int. Cl.
G10L 15/22 (2006.01)
G06N 5/043 (2023.01)
(Continued)

(52) U.S. Cl.
CPC .............. G10L 15/22 (2013.01); G06N 5/043 (2013.01); G10L 15/08 (2013.01); G10L 15/30 (2013.01);
(Continued)

(58) Field of Classification Search
CPC ......... G10L 15/00; G10L 19/00; G10L 25/00; G10L 2015/00; G10L 15/22; G06N 5/00
See application file for complete search history.

(56) References Cited

U.S. PATENT DOCUMENTS 6,937,984 B1* 8/2005 Morgan .................. G10L 15/22
704/275
9,548,053 B1 1/2017 Basye et al.
(Continued)

FOREIGN PATENT DOCUMENTS

CN 1399247 A 2/2003
CN 104956436 A 9/2015
(Continued)

OTHER PUBLICATIONS

International Search Report and Written Opinion of PCT Application No. PCT/JP2018/032323, dated Nov. 20, 2018, 07 pages of ISRWO.

(Continued)

Primary Examiner — Feng-Tzer Tzeng
(74) Attorney, Agent, or Firm — Jeffery Brosemer

(57) ABSTRACT

The present technique relates to an information processing apparatus and an information processing method that can improve the convenience of a voice AI assistance service used in coordination with content. A first information processing apparatus including an insertion unit that inserts a token, which is related to use of a voice AI assistance service in coordination with content, into an audio stream of the content and a second information processing apparatus including a detection unit that detects the inserted token from the audio stream of the content can be provided to improve the convenience of the voice AI assistance service used in coordination with the content. The present technique (Continued)

can be applied to, for example, a system in coordination with the voice AI assistance service.

30 Claims, 24 Drawing Sheets

(51) Int. Cl.
   *G10L 15/08* (2006.01)
   *G10L 15/30* (2013.01)
   *G10L 19/018* (2013.01)
   *G10L 25/51* (2013.01)
   *H04H 20/28* (2008.01)

(52) U.S. Cl.
   CPC ............ *G10L 19/018* (2013.01); *G10L 25/51* (2013.01); *G10L 2015/088* (2013.01); *G10L 2015/223* (2013.01); *H04H 20/28* (2013.01)

(56) References Cited

U.S. PATENT DOCUMENTS

| | | | |
|---|---|---|---|
| 10,079,024 B1* | 9/2018 | Bhimanaik | G10L 17/06 |
| 2003/0018479 A1 | 1/2003 | Oh et al. | |
| 2003/0128861 A1* | 7/2003 | Rhoads | G06F 21/00 382/100 |
| 2006/0282774 A1 | 12/2006 | Covell et al. | |
| 2011/0258705 A1* | 10/2011 | Vestergaard | G06T 1/005 726/26 |
| 2015/0294666 A1* | 10/2015 | Miyasaka | G10L 15/08 704/251 |
| 2015/0348548 A1 | 12/2015 | Piernot et al. | |
| 2016/0295279 A1* | 10/2016 | Srinivasan | H04H 60/58 |
| 2016/0358614 A1* | 12/2016 | Phielipp | G10L 19/018 |
| 2018/0005627 A1 | 1/2018 | Miyasaka et al. | |
| 2018/0350356 A1* | 12/2018 | Garcia | G10L 15/22 |

FOREIGN PATENT DOCUMENTS

| | | | |
|---|---|---|---|
| CN | 105320726 A | | 2/2016 |
| EP | 1278183 A1 | | 1/2003 |
| EP | 2950307 A1 | | 12/2015 |
| JP | 2003-044069 A | | 2/2003 |
| JP | 2005-338454 A | | 12/2005 |
| JP | 2008-305371 A | | 12/2008 |
| JP | 2010-156741 A | | 7/2010 |
| JP | 2010164992 A | * | 7/2010 |
| JP | 2013-160883 A | | 8/2013 |
| JP | 5332602 B2 | | 11/2013 |
| JP | 2016-004270 A | | 1/2016 |
| JP | 6225920 B2 | | 11/2017 |
| KR | 10-2003-0008726 A | | 1/2003 |
| KR | 10-2015-0138109 A1 | | 12/2015 |
| WO | 2014/103099 A1 | | 7/2014 |
| WO | 2015/183991 A1 | | 12/2015 |
| WO | 2016/195890 A1 | | 12/2016 |

OTHER PUBLICATIONS

Extended European Search Report of EP Application No. 18856338.1, dated Oct. 8, 2020, 08 pages.

* cited by examiner

FIG. 12

\<Message\>ask, Drama Facts, for any private information on the casts of XXXDRAMA by XXXCHANNEL\</Message\>

FIG. 13

```
<Message>ask, Drama Facts, for any private information on the casts of XXXDRAMA by XXXCHANNEL
<ds:Signature xmlns:ds="http://www.w3.org/2000/09/xmldsig#">
  <ds:SignedInfo>
    <ds:CanonicalizationMethod Algorithm="http://www.w3.org/TR/2001/REC-xml-c14n-20010315#WithComments"/>
    <ds:SignatureMethod Algorithm="http://www.w3.org/2000/09/xmldsig#dsa-sha1"/>
    <ds:Reference URI=" ">
      <ds:Transforms>
        <ds:Transform Algorithm=" http://www.w3.org/2000/09/xmldsig#enveloped-signature "/>
      </ds:Transforms>
      <ds:DigestMethod Algorithm=" http://www.w3.org/2000/09/xmldsig#sha1"/>
      <ds:DigestValue>60WvtvtdfB+7UniLp/Hl4p7h4bs=</ds:DigestValue>
    </ds:Reference>
  </ds:SignedInfo>
  <ds:SignatureValue>DpEylhQoiUKBoKWmYfajX07LZxiDYgVtUtCNyTgwZgoChzorA2nhkQ==</ds:SignatureValue>
</ds:Signature>
</Message>
```

FIG. 15

IF YOU WANT TO KNOW PRIVATE INFORMATION ON THE CASTS
OF THE PROGRAM, JUST SAY "Service A" (LAUNCH Service A).

IF YOU WANT TO PURCHASE THE PRODUCT INTRODUCED IN THE PROGRAM, JUST SAY "Service A" (LAUNCH Service A).

IF YOU WANT TO KNOW PRIVATE INFORMATION ON THE CASTS OF THE PROGRAM, SAY "Service A, ask, Drama Facts, for any private information on the casts of XXXDRAMA by XXXCHANNEL" (LAUNCH Service A).

IF YOU WANT TO PURCHASE THE PRODUCT INTRODUCED IN THE PROGRAM, SAY "Service A, ask, shoppingApp, my personal account number is 1234567890" (LAUNCH Service A).

291

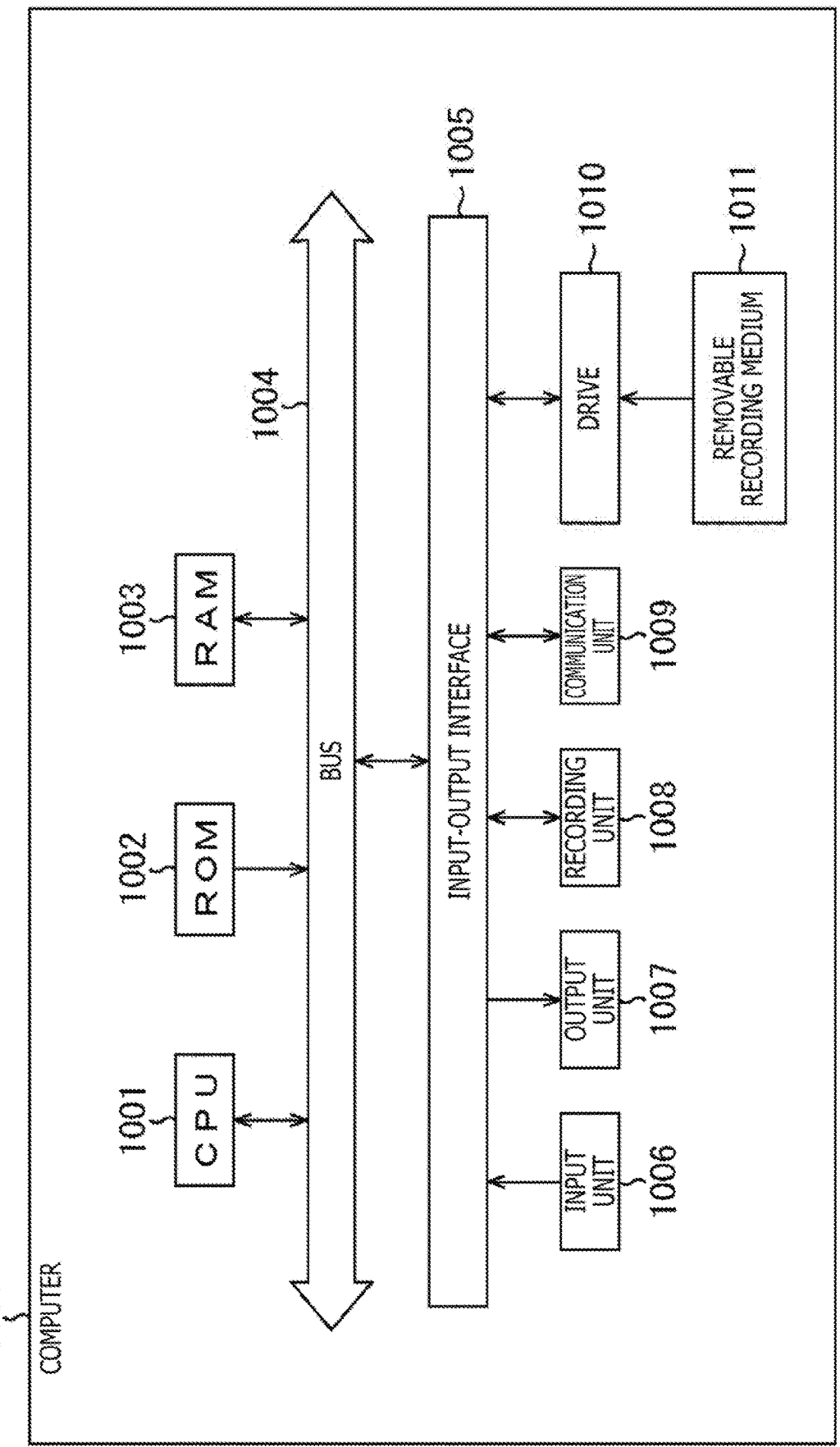

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/032323 filed on Aug. 31, 2018, which claims priority benefit of Japanese Patent Application No. JP 2017-177754 filed in the Japan Patent Office on Sep. 15, 2017. Each of the above-referenced applications is hereby incorporated herein by reference in its entirety.

TECHNICAL FIELD

The present technique relates to an information processing apparatus and an information processing method, and particularly, to an information processing apparatus and an information processing method that can improve convenience of a voice AI assistance service used in coordination with content.

BACKGROUND ART

In recent years, a voice AI assistance service is rapidly spreading. For example, when an end user uses the voice AI assistance service and questions "Where am I?" an answer "You are in a central park" is returned based on the current position of the end user (for example, see PTL 1).

CITATION LIST

Patent Literature

[PTL 1]
Japanese Patent Laid-Open No. 2016-4270

SUMMARY

Technical Problem

Incidentally, there is a request for using the voice AI assistance service in coordination with content reproduced by a receiver, such as a television receiver and a mobile receiver. However, such a technical system is not established, and a technique for improving the convenience of the voice AI assistance service used in coordination with content is desired.

The present technique has been made in view of the circumstances, and the present technique can improve the convenience of a voice AI assistance service used in coordination with content.

Solution to Problem

A first aspect of the present technique provides an information processing apparatus including an insertion unit that inserts a token into an audio stream of the content, the token being related to use of a voice AI assistance service in coordination with content.

The information processing apparatus according to the first aspect of the present technique may be an independent apparatus or may be an internal block included in one apparatus. In addition, the information processing method according to the first aspect of the present technique is an information processing method corresponding to the information processing apparatus according to the first aspect of the present technique described above.

In the information processing apparatus and the information processing method of an aspect of the present technique according to the first aspect of the present technique, the token related to the use of the voice AI assistance service in coordination with the content is inserted into the audio stream of the content.

A second aspect of the present technique provides an information processing apparatus including a detection unit that detects, from an audio stream of content, a token related to use of a voice AI assistance service in coordination with the content.

The information processing apparatus according to the second aspect of the present technique may be an independent apparatus or may be an internal block included in one apparatus. In addition, the information processing method according to the second aspect of the present technique is an information processing method corresponding to the information processing apparatus according to the second aspect of the present technique described above.

In the information processing apparatus and the information processing method of an aspect of the present technique according to the second aspect of the present technique, the token related to the use of the voice AI assistance service in coordination with the content is detected from the audio stream of the content.

Advantageous Effect of Invention

According to the first aspect and the second aspect of the present technique, the convenience of the voice AI assistance service used in coordination with the content can be improved.

Note that the advantageous effects described here may not be limited, and the advantageous effects may be any of the advantageous effects described in the present disclosure.

BRIEF DESCRIPTION OF DRAWINGS

FIG. 12 is a diagram illustrating an example of a message stored in a Message element.

FIG. 13 is a diagram illustrating an example of a case of applying an XML signature to the message stored in the Message element.

FIG. 15 is a diagram illustrating an example of a speech instruction message for prompting to speak a wake word.

FIG. 19 is a diagram illustrating an example of the speech instruction message for prompting to speak the wake word.

FIG. 22 is a diagram illustrating an example of a speech instruction message of a case in which it is assumed that the watermark is not to be inserted.

FIG. 23 is a diagram illustrating an example of the speech instruction message of the case in which it is assumed that the watermark is not to be inserted.

FIG. 24 is a diagram illustrating a configuration example of a computer.

DESCRIPTION OF EMBODIMENTS

Figure 1:
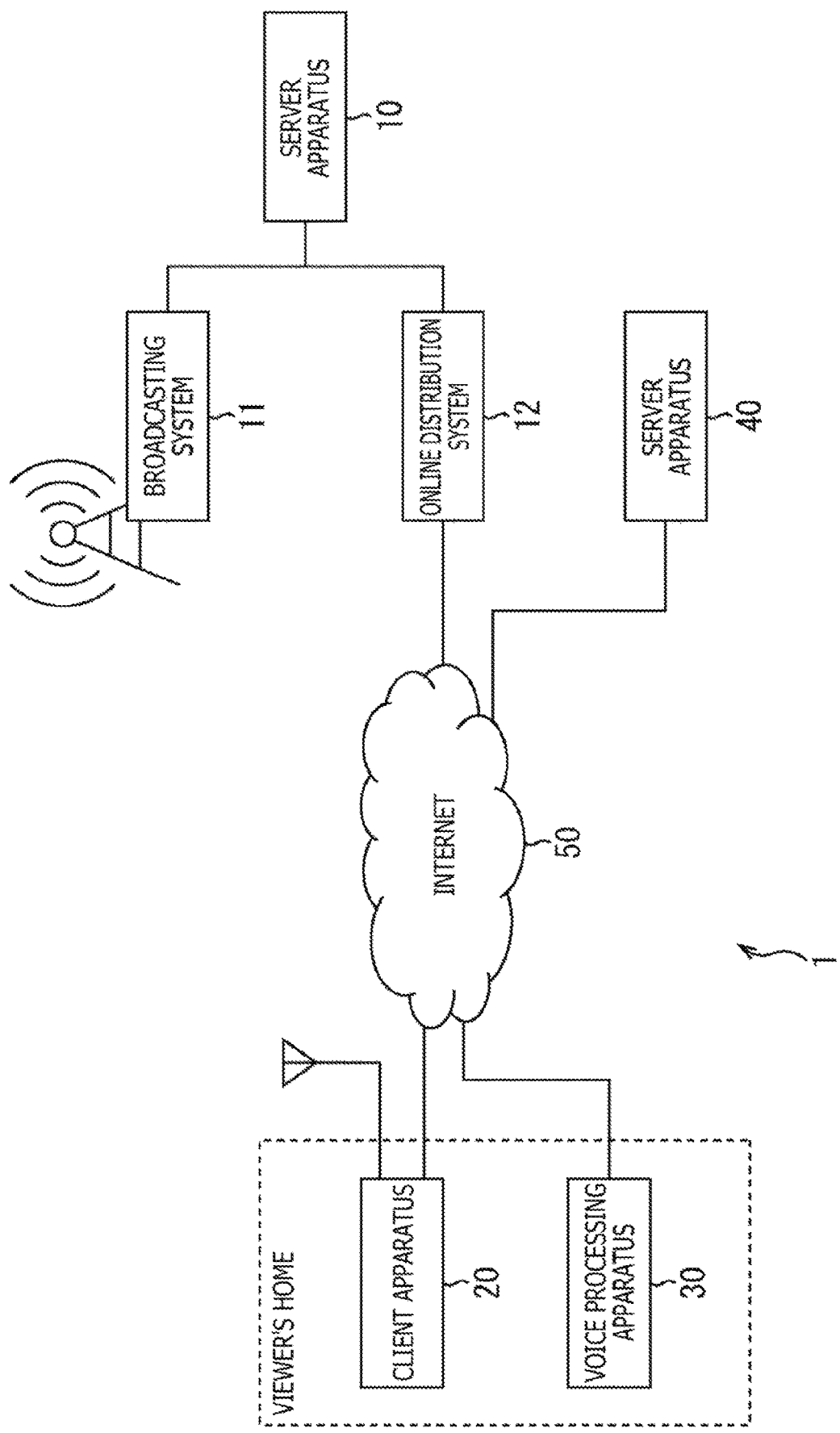
FIG. 1 is a block diagram illustrating a configuration example of a content/voice AI coordination system to which the present technique is applied.

Hereinafter, embodiments of the present technique will be described with reference to the drawings. Note that the embodiments will be described in the following order.
1. Configuration of System
2. Embodiments of Present Technique
(1) First Embodiment: Selection of Recognition Target of Voice AI Assistance Using WM
   (A) Configuration of Inserting Watermark on Transmission Side
   (B) Configuration of Inserting Watermark on Reception Side
(2) Second Embodiment: Supplement of Speech to Voice AI Assistance Using WM
   (C) Configuration of Inserting Watermark on Transmission Side
   (D) Configuration of Inserting Watermark on Reception Side
3. Modifications
4. Configuration of Computer
<1. Configuration of System>

In recent years, a voice AI assistance service is rapidly spreading. In this type of service, voice recognition is performed based on audio data detected or collected by an application executed by a device with voice detection and sound collection functions (for example, smart speaker or the like) or a mobile device with a microphone function (for example, smartphone, tablet computer, or the like). Furthermore, a question or the like of an end user is answered based on the voice recognition obtained in this way.

For example, Alexa (registered trademark) included in Amazon Echo (registered trademark) that is a representative voice AI assistance service includes two frameworks. One is Alexa Voice Service (AVS) that performs voice recognition, natural language analysis, and the like, and the other is Alexa Skills Kit (ASK) having various other functions packaged in a form of skills (Skills) for connection to Alexa Service.

Here, the Alexa Skills Kit is a package or an API (Application Programming Interface) group defining, for example, to which voice the service will react, which word is to be set as a parameter, which function is to be executed, how to return the replied answer to Alexa, and the like. Part of the Alexa Skills Kit that is actually executed is called a skill (Skill).

For example, it is assumed that the end user speaks the following words toward a device, such as a smart speaker, on the local side with voice detection and sound collection functions.

"Alexa, ask Anime Facts for a fact."

The first word "Alexa" is called a wake word (Wake Word). Once the microphone of the device on the local side detects the word, communication with a server on the cloud side is started, and the subsequent words are sent as audio data to the server on the cloud side. The next word "ask" is called a launch phrase (Launch phrase), and this tells the server on the cloud side that the words following this indicate a skill name. In the example, "Anime Facts" is the skill name.

Note that examples of the launch phrase other than "ask" include "tell," "launch," "load," "begin," "open," "start," and the like, and the words cannot be used for the skill name. In addition, there is also a method of using a conjunction to indicate the skill name. In the example described above, in a case where the end user addresses "Alexa, can you give me a fact from Anime Facts" in the example, the word "from" can be recognized to determine that "Anime Facts" following the word indicates the skill name.

The final "for a fact" is called Utterance, and Alexa Skills Kit sets the correspondence between the Utterance, the process and procedure to be actually executed, and the function. In other words, as the end user says "for a fact" here, the server on the cloud side determines to which process, procedure, and function the Utterance "for a fact" is related.

Since "ask Anime Facts for a fact" means "ask knowledge of anime," the server on the cloud side interprets that the meaning is the same even if "fact" is "trivia" or the like. The server on the cloud side launches the same process, continuation, and function as those of the location where the Utterance "for a fact" is set. As for the details of the process, for example, the details of the knowledge of anime can be returned as audio data to the device on the local side, and the voice can be used to allow the end user to recognize the details through the device on the local side.

The present technique can improve the convenience of the voice AI assistance service in using the voice AI assistance service in conjunction with the content of a CM, a program, or the like.

(Configuration Example of Content/Voice AI Coordination System)

FIG. 1 is a block diagram illustrating a configuration example of a content/voice AI coordination system to which the present technique is applied.

A content/voice AI coordination system 1 of FIG. 1 is a system for distributing the content, and the voice AI assistance service can be used in coordination with the distributed content.

In FIG. 1, the content/voice AI coordination system 1 includes a server apparatus 10, a broadcasting system 11, an online distribution system 12, a client apparatus 20, a voice processing apparatus 30, and a server apparatus 40. Furthermore, in FIG. 1, the client apparatus 20 and the voice processing apparatus 30 installed at viewer's home can be connected to the online distribution system 12 and the server apparatus 40 installed in a data center or the like through Internet 50, and various types of data can be exchanged.

The server apparatus 10 stores content to be distributed. Here, the content to be distributed is, for example, content of a CM, a program, or the like. Note that examples of the program include programs of dramas, news, shopping channels, anime, sports, and the like.

The server apparatus 10 processes a stream of the content to be distributed and supplies the stream to the broadcasting system 11 or the online distribution system 12 according to a distribution system of the content.

The broadcasting system 11 includes one or a plurality of broadcasting servers or the like. The broadcasting system 11 applies a process (for example, modulation process or the like) corresponding to a predetermined broadcasting method to the content supplied from the server apparatus 10 and transmits a broadcast wave of data obtained as a result of the process from an antenna provided at a transmission station.

The online distribution system 12 includes one or a plurality of communication servers or the like. The online distribution system 12 applies a process according to a predetermined communication system to the content supplied from the server apparatus 10 and distributes (streaming distribution) data (packets) obtained as a result of the process through the Internet 50.

The client apparatus 20 includes, for example, a fixed receiver, such as a television receiver and a personal computer, or a mobile receiver, such as a smartphone, a mobile phone, and a tablet computer.

The client apparatus 20 receives and processes a broadcast wave transmitted from the broadcasting system 11 to thereby reproduce the content and outputs the video and voice of the CM, the program, or the like. In addition, the client apparatus 20 receives and processes data distributed from the online distribution system 12 through the Internet 50 to thereby reproduce the content and outputs the video and voice of the CM, the program, or the like.

The voice processing apparatus 30 is, for example, a speaker that can be connected to a network, such as a home LAN (Local Area Network) and is also called a smart speaker, a home agent, or the like. This type of speaker can not only reproduce music, but can also, for example, function as a user interface of the voice AI assistance service or perform voice operation for a device, such as lighting equipment and an air conditioner.

The voice processing apparatus 30 can individually coordinate with the server apparatus 40 on the cloud side to provide a voice AI assistance service to the end user (viewer of content).

Here, the voice AI assistance service is, for example, a function or a service for combining processes, such as a voice recognition process and a natural language analysis process, to appropriately answer or act in response to a question or a request of the end user.

Examples of the functions for providing the voice AI assistance service include a sound collection module, a voice recognition module, and the like. All of the functions may be included in the voice processing apparatus 30 on the local side, or part of the functions may be included in the server apparatus 40 on the cloud side.

The server apparatus 40 is installed in the data center or the like, and the server apparatus 40 has a function for providing the voice AI assistance service, various types of databases, and the like. The server apparatus 40 executes a process regarding the voice AI assistance service in response to a request from the voice processing apparatus 30 and returns the processing result to the voice processing apparatus 30 through the Internet 50.

The content/voice AI coordination system 1 is configured in this way.

Note that one client apparatus 20 (for example, television receiver) and one voice processing apparatus 30 (for example, smart speaker) are installed at the viewer's home in the content/voice AI coordination system 1 of FIG. 1 in the illustrated case, and for example, the client apparatus 20 and the voice processing apparatus 30 can be installed at each viewer's home. In addition, although it is assumed that the client apparatus 20 and the voice processing apparatus 30 are installed in the same room at viewer's home, the client apparatus 20 and the voice processing apparatus 30 may be installed in different rooms.

In addition, although one server apparatus 10 and one server apparatus 40 are provided in the content/voice AI coordination system 1 of FIG. 1 in the illustrated case, a plurality of these server apparatuses may be provided for, for example, each function or business operator.

Note that in the following description, the client apparatus 20 is provided on the reception side (viewer side) with respect to the server apparatus 10 provided on the transmission side (broadcasting station side). In addition, the voice processing apparatus 30 is provided on the local side with respect to the server apparatus 40 provided on the cloud side.

<2. Embodiments of Present Technique>

(1) First Embodiment

For example, in a CM or the like of a hamburger franchise XYZ reproduced by the client apparatus 20, such as a television receiver, details of the CM, such as a voice message "Service A, ask Hamburger restaurant XYZ "What's XYZ Burger"" supplementing the CM of "XYZ burger," are intentionally provided in the voice of the CM to cause the voice AI assistance service to involuntarily answer the question. This use case will be illustrated.

Note that the case here is not limited to the voice of the CM, and for example, a case of an application or the like broadcasted and provided in association with the CM is also included. Furthermore, the "intentional" here means that there is no consent of the viewer.

Examples of the usage include the following intentions (including accidental ones).

In other words, first, information that cannot be entirely told in the details of the CM is told through the voice AI assistance service. Second, when the viewer later wants to know the details of the product provided in the CM through the voice AI assistance service, the viewer is informed how to speak (question) to the voice AI assistance service. Note that the details of the CM of the former are details authorized by some authority, censorship organization, or the like.

Furthermore, third, the interest in the details of the CM is stored in profile information (preference information) of the viewer that may be managed on the voice AI assistance service side. Fourth, a malicious broadcasting program or application makes a DoS attack (Denial of Service attack) against the voice AI assistance service by using synchronous distributing characteristics of the broadcast. In this way, there can be various intentions.

However, the information of the voice of the CM and the voice AI assistance service is exchanged without consent of the viewer. Therefore, it may be (it is likely) none of the viewer's business if the voice AI assistance service explains the information that the viewer does not want to know much in detail. In addition, it may be (it is likely) annoying for the user if the interest in the details of the CM is arbitrarily stored in the profile information of the viewer.

To prevent frequent voice AI assistance service coordination without the presence of the viewer (so to say, free ride), it may be desirable to set restrictions so that the voice AI assistance service side reacts to only the details of the question spoken by the end user.

An example of a method of handling such a case includes a method of registering voice models of end users in advance to specify the speaking user of conversation (specify the question of the voice user to be recognized). A voice AI assistance service without such a speaker specifying function can adopt a method of managing a blacklist (for example, list of text character strings) that is a list of questions the service will not react to, in order to prevent reaction to the question even if the voice of the CM is recognized.

In the example described above, even if a question "Service A, ask Hamburger restaurant XYZ "What's XYZ Burger"" is detected in the example, a blacklist including the question is managed to prevent executing a corresponding process.

However, the blacklist to be managed may become enormous in the method. The blacklist needs to be held for a certain period or permanently, and matching evaluation (for example, real-time search of database or the like) needs to be immediately performed for all of the questions. This is not realistic. Note that the period of holding the blacklist here means, for example, a period in which the end user may ask a question.

Similarly, there can also be a method of managing a white list (for example, list of text character strings) that is a list of questions the service can react to. However, the white list may also become enormous in this case, and this is unrealistic.

Note that the above-described method of specifying the speaking user of conversion is implemented by, for example, Google Home (registered trademark) that is another representative example of the voice AI assistance service.

A first embodiment of the present technique proposes inserting a token, which is for prohibiting or permitting the voice recognition process of the voice AI assistance service in coordination with the content, as an audio watermark into an audio stream of the content.

In other words, in the first embodiment, a sound collection device of the voice AI assistance service, which is the voice processing apparatus 30 provided on the local side or the server apparatus 40 provided on the cloud side that analyzes the collected audio stream, is provided with a watermark detection function.

In this way, in a case where a token (voice recognition process prohibition token) is included as an audio watermark in the collected voice, it is assumed that the subsequent process based on the voice recognition result of the audio stream cannot be continued.

Note that although there are various systems of audio watermark, any system can be used as long as necessary and sufficient tokens can be superimposed on the target audio stream.

(Example of Voice Recognition Process Prohibition Token)

Figure 2:
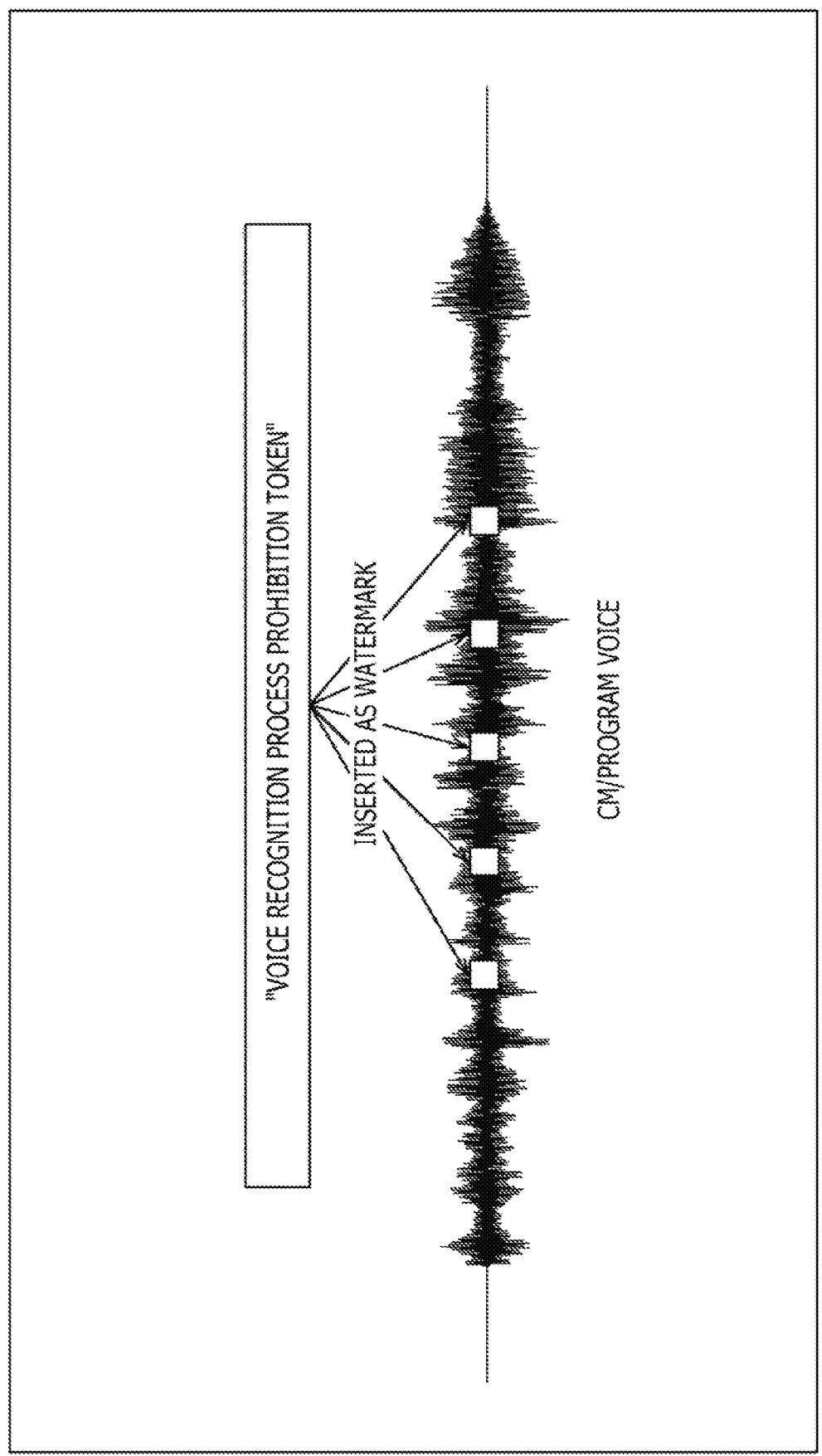
FIG. 2 is a diagram illustrating an example of a voice recognition process prohibition token embedded as an audio watermark into a baseband stream.

FIG. 2 is a diagram illustrating an example of a voice recognition process prohibition token embedded as an audio watermark into a baseband audio stream.

For example, it is assumed that an audio stream of a CM or a program (or part of the CM or the program) includes voice that should not be delivered as a valid voice recognition result to a subsequent process after the voice recognition process of the voice AI assistance service is executed.

In this case, the server apparatus 10 on the transmission side (broadcasting station side) decodes all of the audio streams to provide baseband audio streams, and an audio WM insertion module sets, as audio marks, tokens (voice recognition process prohibition tokens) generated by a token generator and inserts the audio watermarks into the baseband audio streams.

Note that the voice recognition process prohibition token inserted as an audio watermark can be inserted not only by the server apparatus 10 on the transmission side, but also by the client apparatus 20 on the reception side. Therefore, the configuration of inserting the audio watermark on the transmission side and the configuration of inserting the audio watermark on the reception side will be described.

(A) Configuration of Inserting Watermark on Transmission Side (Example of System Configuration)

Figure 3:
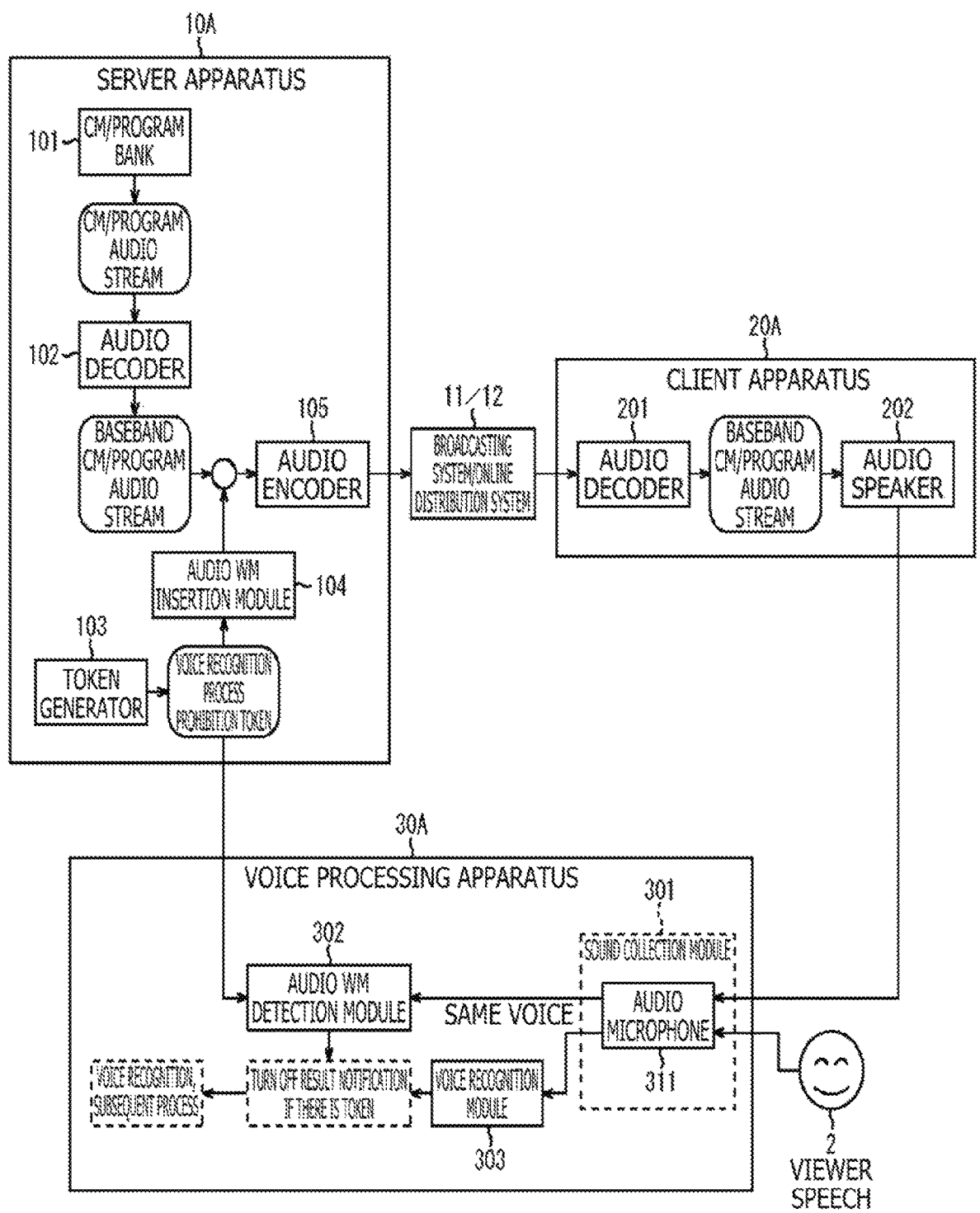
FIG. 3 is a block diagram illustrating a first example of a configuration of the content/voice AI coordination system according to a first embodiment.

FIG. 3 is a block diagram illustrating a first example of the configuration of the content/voice AI coordination system 1 according to the first embodiment.

The content/voice AI coordination system 1 of FIG. 3 includes a server apparatus 10A, a client apparatus 20A, and a voice processing apparatus 30A.

Note that although the process applied to the audio streams among the components of the content, such as a CM and a program, will be mainly described below, the server apparatus 10A, the client apparatus 20A, and the like also apply the process to video streams.

In FIG. 3, the server apparatus 10A includes a CM/program bank 101, an audio decoder 102, a token generator 103, an audio WM insertion module 104, and an audio encoder 105.

The CM/program bank 101 stores a large amount of content, such as CMs and programs. The CM/program bank 101 supplies, to the audio decoder 102, audio streams of the CM or the program to be distributed (hereinafter, described as CM/program audio streams) among the streams of the CM or the program (hereinafter, described as CM/program streams).

Note that the voice obtained from the CM/program audio stream may include voice for which the voice recognition process should be prohibited.

The audio decoder 102 decodes the CM/program audio stream supplied from the CM/program bank 101 and supplies a baseband CM/program audio stream obtained as a result of the decoding to the audio WM insertion module 104.

The token generator 103 generates a voice recognition process prohibition token based on token generation data and supplies the voice recognition process prohibition token to the audio WM insertion module 104. In addition, an audio WM detection module 302 of the voice processing apparatus 30A is also notified of the voice recognition process prohibition token.

Here, the token generation data is, for example, data for generating a token or the like to prevent reaction to the question even if specific voice is provided in the CM of the hamburger franchise XYZ. The token generation data corresponds to, for example, the determination of the broadcasting station, the entity of the voice AI assistance service, or other business operators.

In addition, the notification method of the voice recognition process prohibition token can be a method of using communication through the Internet 50 to notify the voice recognition process prohibition token, as well as various other methods, such as, for example, a method of notifying the voice recognition process prohibition token through broadcasting and a method of recording and providing the voice recognition process prohibition token to a recording medium, such as a semiconductor memory and an optical disk, and causing the voice processing apparatus 30A to read the voice recognition process prohibition token.

In a word, the notification method is arbitrary as long as the audio WM detection module 302 of the voice processing apparatus 30A is notified of the voice recognition process prohibition token generated by the token generator 103.

The audio WM insertion module 104 inserts (encodes), as an audio watermark, the voice recognition process prohibition token supplied from the token generator 103 into the baseband CM/program audio stream supplied from the audio decoder 102 and supplies the baseband CM/program audio stream to the audio encoder 105.

The audio encoder 105 encodes the baseband CM/program audio stream supplied from the audio WM insertion module 104 (stream in which the voice recognition process prohibition token is inserted as an audio watermark on the transmission side).

Furthermore, the server apparatus 10A transmits the CM/program audio stream obtained as a result of the encoding by the audio encoder 105 to the broadcasting system 11 or the online distribution system 12 according to the distribution system of the content.

The broadcasting system 11 processes the CM/program stream transmitted from the server apparatus 10A (stream in which the voice recognition process prohibition token is inserted as an audio watermark on the transmission side) and transmits, as a broadcast wave, data obtained as a result of the process.

The online distribution system 12 processes the CM/program stream transmitted from the server apparatus 10A (stream in which the voice recognition process prohibition token is inserted as an audio watermark on the transmission side) and distributes data (packets) obtained as a result of the process through the Internet 50.

The client apparatus 20A receives the CM/program stream distributed by the broadcasting system 11 or the online distribution system 12. In FIG. 3, the client apparatus 20A includes an audio decoder 201 and an audio speaker 202.

The audio decoder 201 decodes the CM/program audio stream received from the broadcasting system 11 or the online distribution system 12 and supplies the baseband CM/program audio stream obtained as a result of the decoding to the audio speaker 202.

The audio speaker 202 outputs voice corresponding to the baseband CM/program audio stream supplied from the audio decoder 201.

Note that although only the CM/program audio stream is described here, the CM/program video stream is also decoded by a video decoder in the client apparatus 20A, and a video of a CM or a program corresponding to the baseband CM/program video stream is displayed on a display.

In FIG. 3, the voice processing apparatus 30A includes a sound collection module 301, the audio WM detection module 302, and a voice recognition module 303 as functions of the voice AI assistance service. In addition, the sound collection module 301 includes an audio microphone 311.

In other words, in the voice processing apparatus 30A, the audio microphone 311 of the sound collection module 301, the audio WM detection module 302, and the voice recognition module 303 provide a system corresponding to the voice input from the client apparatus 20A or the voice input from a viewer 2.

Note that as described above, the audio WM detection module 302 holds in advance the voice recognition process prohibition token notified by the server apparatus 10A (token generator 103 of the server apparatus 10A).

The audio microphone 311 collects the voice output from the audio speaker 202 of the client apparatus 20A and supplies the audio stream obtained as a result of the collection to the audio WM detection module 302 and the voice recognition module 303.

The audio WM detection module 302 detects the audio watermark inserted into the audio stream supplied from the audio microphone 311 and determines whether or not the voice recognition process prohibition token notified by the server apparatus 10A is inserted as an audio watermark.

The voice recognition module 303 applies a voice recognition process to the audio stream supplied from the audio microphone 311.

In a case where the audio WM detection module 302 determines that the voice recognition process prohibition token is not inserted as an audio watermark, the voice recognition module 303 supplies the voice recognition result to a subsequent processing unit that executes a subsequent process. In this case, the subsequent processing unit executes the subsequent process related to the voice AI assistance service based on the voice recognition result supplied from the voice recognition module 303.

Furthermore, in a case where the audio WM detection module 302 determines that the voice recognition process prohibition token is inserted as an audio watermark, the voice recognition module 303 does not deliver the voice recognition result to the subsequent processing unit.

In addition, the audio microphone 311 collects the voice of the speech of the viewer 2 and supplies an audio stream obtained as a result of the collection to the audio WM detection module 302 and the voice recognition module 303.

The audio WM detection module 302 detects the audio watermark inserted into the audio stream supplied from the audio microphone 311 and determines whether or not the voice recognition process prohibition token notified by the server apparatus 10A is inserted as an audio watermark.

Here, the audio watermark is not inserted into the audio stream corresponding to the voice of the speech of the viewer 2, and the audio WM detection module 302 always determines that the voice recognition process prohibition token is not inserted.

The voice recognition module 303 applies a voice recognition process to the audio stream supplied from the audio microphone 311.

Since the audio WM detection module 302 always determines that the voice recognition process prohibition token is not inserted, the voice recognition module 303 supplies the voice recognition result to the subsequent processing unit that executes the subsequent process. Therefore, the subsequent processing unit will always execute the subsequent process related to the voice AI assistance service based on the voice recognition result supplied from the voice recognition module 303.

Note that although the voice processing apparatus 30A on the local side executes all of the processes of the voice AI assistance service in FIG. 3 for the convenience of description, the server apparatus 40 on the cloud side may execute part of the processes of the voice AI assistance service.

For example, in a case where the voice processing apparatus 30A on the local side has the function of the sound collection module 301, and the server apparatus 40 on the cloud side has the functions of the audio WM detection module 302, the voice recognition module 303, and the subsequent processing unit, the voice processing apparatus 30A and the server apparatus 40 coordinate with each other to realize the voice AI assistance service.

In addition, although it is basically sufficient to include one type of voice recognition process prohibition token, such as, for example, a token for preventing reaction to the question even if specific voice is provided in the CM of the hamburger franchise XYZ, the operation may be performed by limiting the types to several types as necessary.

(Flow of Content/Voice AI Coordination Process)

Next, a flow of the content/voice AI coordination process in the case where the watermark is inserted on the transmission side will be described with reference to flow charts of FIGS. 4 and 5.

Figure 4:
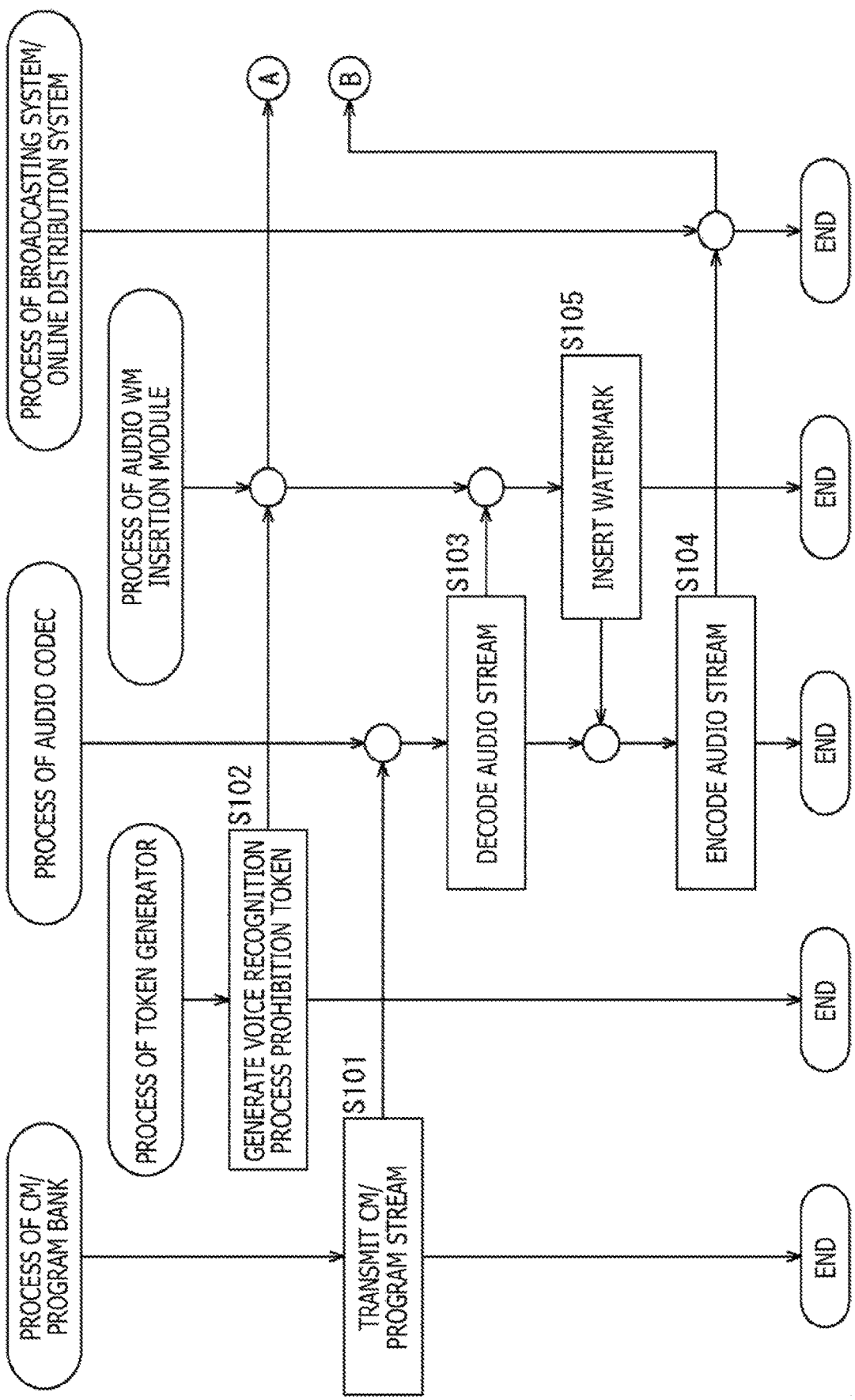
FIG. 4 is a flow chart describing a flow of a content/voice AI coordination process in a case where the watermark is inserted on a transmission side.

Note that FIG. 4 is a flow chart illustrating a flow of the process on the transmission side executed by the server apparatus 10A and one of the broadcasting system 11 and the online distribution system 12. On the other hand, FIG. 5 is a flow chart illustrating a flow of the process on the reception side executed by the client apparatus 20A and the voice processing apparatus 30A.

In step S101, the CM/program bank 101 transmits a stream of a CM/program stored in the CM/program bank 101. Here, a CM/program audio stream is transmitted to the audio decoder 102.

In step S102, the token generator 103 generates a voice recognition process prohibition token based on the token generation data.

Here, an example of the generated voice recognition process prohibition token includes a token for preventing reaction to the question even if the voice "Service A, ask Hamburger restaurant XYZ "What's XYZ burger"" is provided in the CM of the hamburger franchise XYZ. In addition, the audio WM detection module 302 of the voice processing apparatus 30 is notified in advance of the voice recognition process prohibition token through communication or the like.

In step S103, the audio decoder 102 decodes the CM/program audio stream transmitted in the process of step S101. As a result of the decoding, a baseband CM/program audio stream is obtained.

In step S105, the audio WM insertion module 104 inserts (encodes), as an audio watermark, the voice recognition process prohibition token obtained in the process of step S102 into the baseband CM/program audio stream obtained in the process of step S103.

In step S104, the audio encoder 105 encodes the baseband CM/program audio stream obtained in the process of step S105 in which the audio watermark is inserted.

Note that although only the CM/program audio stream is described here to simplify the description, the CM/program audio stream is multiplexed with another stream, such as a CM/program video stream, as necessary and processed in the server apparatus 10A.

In this way, the CM/program stream obtained by the server apparatus 10A (stream in which the voice recognition process prohibition token is inserted as an audio watermark on the transmission side) is transmitted to the broadcasting system 11 or the online distribution system 12 according to the distribution system of the content.

In other words, in a case where the CM/program stream is distributed through broadcasting, the broadcasting system 11 processes the CM/program stream transmitted from the server apparatus 10A (stream in which the voice recognition process prohibition token is inserted as an audio watermark on the transmission side) and transmits, as a broadcast wave, the data obtained as a result of the process.

Furthermore, in the case where the CM/program stream is distributed through communication, the online distribution system 12 processes the CM/program stream transmitted from the server apparatus 10A (stream in which the voice recognition process prohibition token is inserted as an audio watermark on the transmission side) and distributes the data obtained as a result of the process through the Internet 50.

Figure 5:
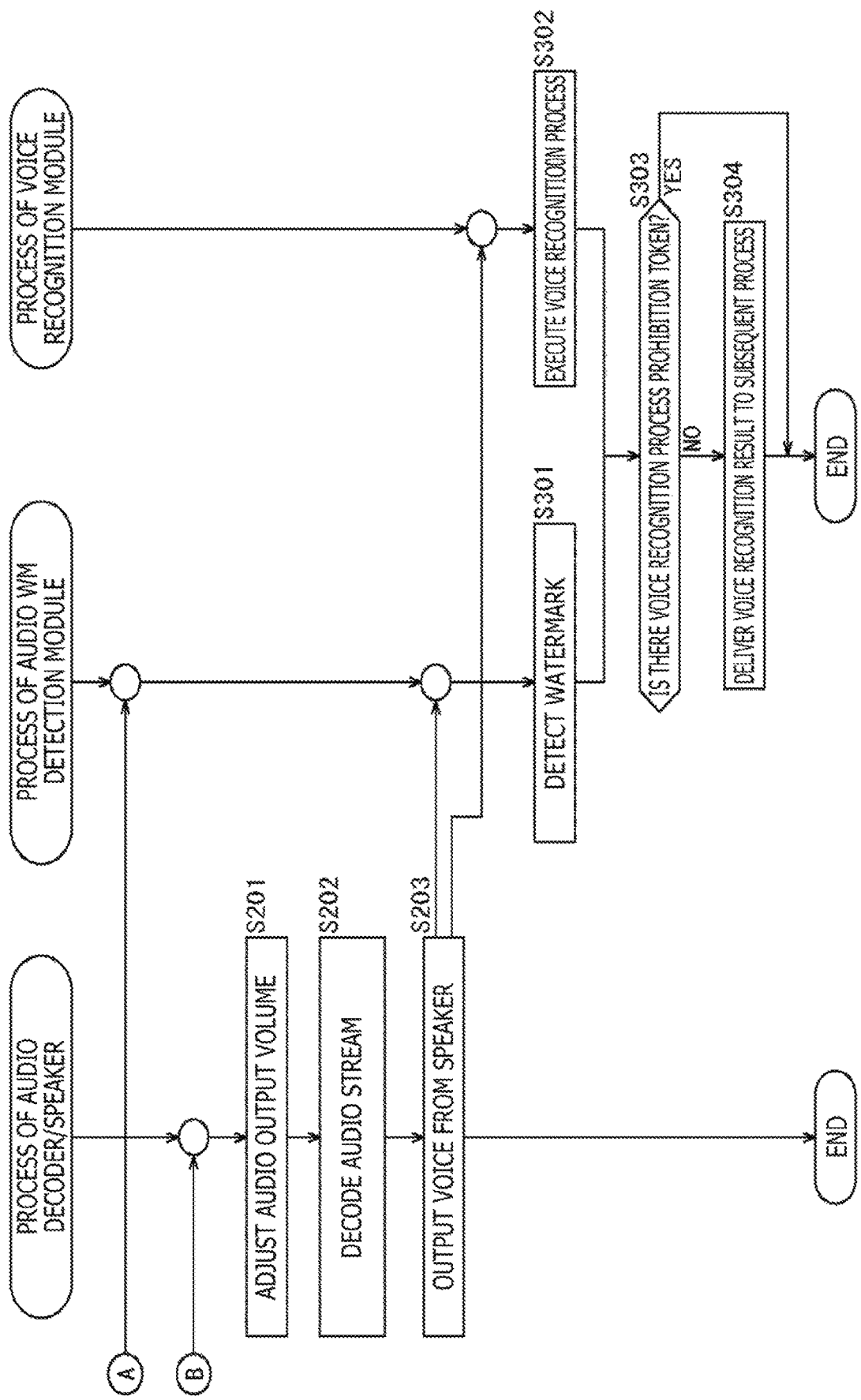
FIG. 5 is a flow chart describing the flow of the content/voice AI coordination process in the case where the watermark is inserted on the transmission side.

In this way, the CM/program stream distributed by the broadcasting system 11 or the online distribution system 12 in FIG. 4 is received by the client apparatus 20A in FIG. 5. In the client apparatus 20A, the CM/program stream is processed, and the CM/program audio stream is input to the audio decoder 201.

Note that the client apparatus 20A adjusts the audio output volume of the audio speaker 202 so that the volume output from the audio speaker 202 becomes sufficient (S201). Here, the audio speaker 202 is controlled so that the volume is set to a level that allows the audio microphone 311 included in the voice processing apparatus 30A to collect sound.

Therefore, the client apparatus 20A instructs the viewer 2 to adjust the volume (volume up) if necessary. The adjustment may be instructed through, for example, voice from the audio speaker 202, or a message for instructing the adjustment may be presented on a screen.

In step S202, the audio decoder 201 decodes the CM/program audio stream. As a result of the decoding, a baseband CM/program audio stream is obtained.

In step S203, the audio speaker 202 outputs voice corresponding to the baseband CM/program audio stream obtained in the process of step S202.

Note that although only the CM/program audio stream is described to simplify the description here, the video decoder in the client apparatus 20A also decodes the CM/program video stream, and the video of the CM or the program corresponding to the baseband CM/program video stream is displayed on the display.

The voice output from the audio speaker 202 of the client apparatus 20A is collected by the audio microphone 311 of the voice processing apparatus 30A.

In addition, the audio stream corresponding to the voice collected by the audio microphone 311 is supplied to the audio WM detection module 302 and the voice recognition module 303. Note that the audio WM detection module 302 is notified in advance of the voice recognition process prohibition token from the server apparatus 10A through communication or the like.

In step S301, the audio WM detection module 302 detects the audio watermark inserted into the audio stream corresponding to the voice collected by the audio microphone 311 (voice output from the client apparatus 20A).

In step S302, the voice recognition module 303 applies a voice recognition process to the audio stream corresponding to the voice collected by the audio microphone 311 (voice output from the client apparatus 20A).

Once the process of steps S301 and S302 is finished, the process proceeds to step S303. In step S303, the audio WM detection module 302 determines whether or not the voice recognition process prohibition token notified by the server apparatus 10A is inserted as an audio watermark inserted into the audio stream based on the detection result obtained in the process of step S301.

In a case where the audio WM detection module 302 determines that the voice recognition process prohibition token is not inserted as an audio watermark in step S303, the process proceeds to step S304. In step S304, the voice recognition module 303 delivers the voice recognition result obtained in the process of step S302 to the subsequent process according to the determination result of the process in step S303.

On the other hand, in a case where the audio WM detection module 302 determines that the voice recognition process prohibition token is inserted as an audio watermark in step S303, the process of step S304 is skipped. In other words, it is assumed that the voice recognition result of the audio stream is invalid in this case, and the voice recognition result is not delivered to the subsequent process (voice recognition result is discarded).

In this way, in the case where the voice recognition process prohibition token is inserted into the audio stream, the voice recognition result of the audio stream is invalid in the voice processing apparatus 30A. Therefore, the voice recognition process prohibition token can be set and managed even if, for example, the voice "Service A, ask Hamburger restaurant XYZ "What's XYZ Burger"" is provided in the CM of the hamburger franchise XYZ, and the reaction to the question can be prevented when the voice of the CM is recognized in the voice AI assistance service.

The flow of the content/voice AI coordination process in the case where the watermark is inserted on the transmission side has been described.

(Flow of Voice AI Process Corresponding to Viewer Speech)

Next, a flow of a voice AI process corresponding to viewer speech will be described with reference to a flow chart of FIG. 6.

Once the viewer 2 speaks (S11), the following process is executed in the voice processing apparatus 30A. In other words, the voice of the speech of the viewer 2 is collected by the audio microphone 311 of the voice processing apparatus 30A.

Furthermore, the audio stream corresponding to the voice collected by the audio microphone 311 (voice spoken by the viewer 2) is supplied to the audio WM detection module 302 and the voice recognition module 303. Note that the audio WM detection module 302 is notified in advance of the voice recognition process prohibition token from the server apparatus 10A.

In step S306, the audio WM detection module 302 detects the audio watermark from the audio stream corresponding to the voice collected by the audio microphone 311.

However, the audio watermark is not inserted into the audio stream corresponding to the voice of the speech of the viewer 2, and the audio WM detection module 302 cannot detect the voice recognition process prohibition token.

In step S307, the voice recognition module 303 applies the voice recognition process to the audio stream corresponding to the voice collected by the audio microphone 311.

Once the process of steps S306 and S307 is finished, the process proceeds to step S308. In step S308, the voice recognition process prohibition token is always not inserted into the audio stream, and the voice recognition module 303 delivers the voice recognition result of the audio stream to the subsequent process by assuming that the voice recognition result is valid.

In this way, the voice recognition process prohibition token is not detected in the case where the viewer 2 speaks. Therefore, the voice recognition result of the voice recognition module 303 is valid, and the subsequent process will be always executed. The flow of the voice AI process corresponding to the viewer speech has been described.

Note that examples of variations of the token in the above-described configuration in which the watermark is inserted on the transmission side include not only the token for involuntarily invalidating the handling process of the voice recognition result, but also a token for inquiring once for the intention of the viewer 2. In other words, two types of tokens are prepared here. One is a token for involuntarily invalidating the handling process of the voice recognition result, and the other is a token for inquiring the viewer 2 whether to apply the handling process to the voice recognition result just before the handling process is invalidated.

Furthermore, in a case where the latter token is detected by the audio WM detection module 302 of the voice AI assistance service, for example, voice of a confirmation message "Do you accept arbitrary use of the voice AI assistance service using the voice of the CM?" is output from the voice processing apparatus 30A to check the intention of the viewer 2.

In a case where the viewer 2 speaks "Yes" in response to the confirmation message, the handling process of the voice recognition result is validated, and the voice recognition result is delivered to the subsequent process. On the other hand, in a case where the viewer 2 speaks "No," the handling process of the voice recognition result is invalidated, and the voice recognition result is not delivered to the subsequent process.

(B) Configuration of Inserting Watermark on Reception Side

Although the server apparatus 10 on the transmission side (broadcasting station side) executes the process of inserting the watermark in the description above, the client apparatus 20 (for example, television receiver) on the reception side may execute the process. In the case where the client apparatus 20 on the reception side executes the process of inserting the watermark, an application, such as, for example, a broadcasting application associated with broadcasting, can be executed to realize the process.

Here, in the case where the server apparatus 10 on the transmission side executes the process of inserting the watermark, the same voice (for example, voice of CM or program) is sent to all viewers, and the intentions of individual viewers cannot be taken into account to perform the control. However, the client apparatus 20 on the reception side can execute the application to execute the process of inserting the watermark, and this configuration can realize, for example, the following.

In other words, the intention of the viewer can be reflected on whether or not to continue the handling process of the voice recognition result of the voice AI assistance service, and this allows personalization. Here, the intention of the viewer can be checked by, for example, displaying a confirmation message as illustrated in FIG. 7.

Figure 7:
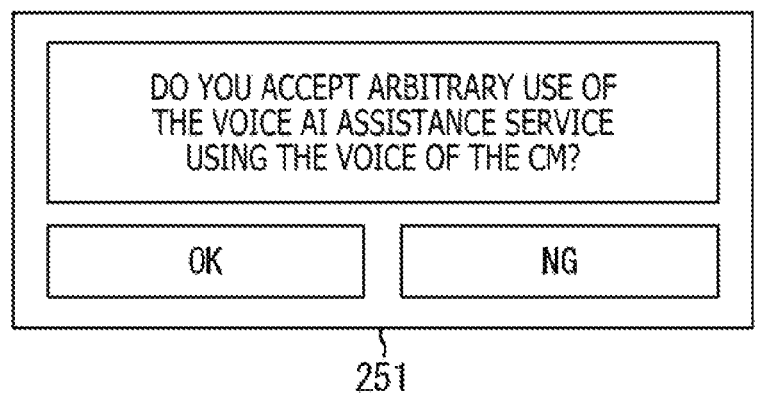
FIG. 7 is a diagram illustrating an example of a confirmation message for using a voice AI assistance service.

In FIG. 7, a confirmation message 251 "Do you accept arbitrary use of the voice AI assistance service using the voice of the CM?" is displayed. In response to the confirmation message 251, the viewer operates an "OK button" in a case where the viewer permits the arbitrary use, and the process of inserting the audio watermark is not executed. On the other hand, the viewer operates an "NG button" in a case where the viewer does not permit the arbitrary use, and the process of inserting the audio watermark is executed.

Hereinafter, the configuration and a flow of the process in the case where the client apparatus 20 on the reception side inserts the watermark will be illustrated.

(Example of System Configuration)

Figure 8:
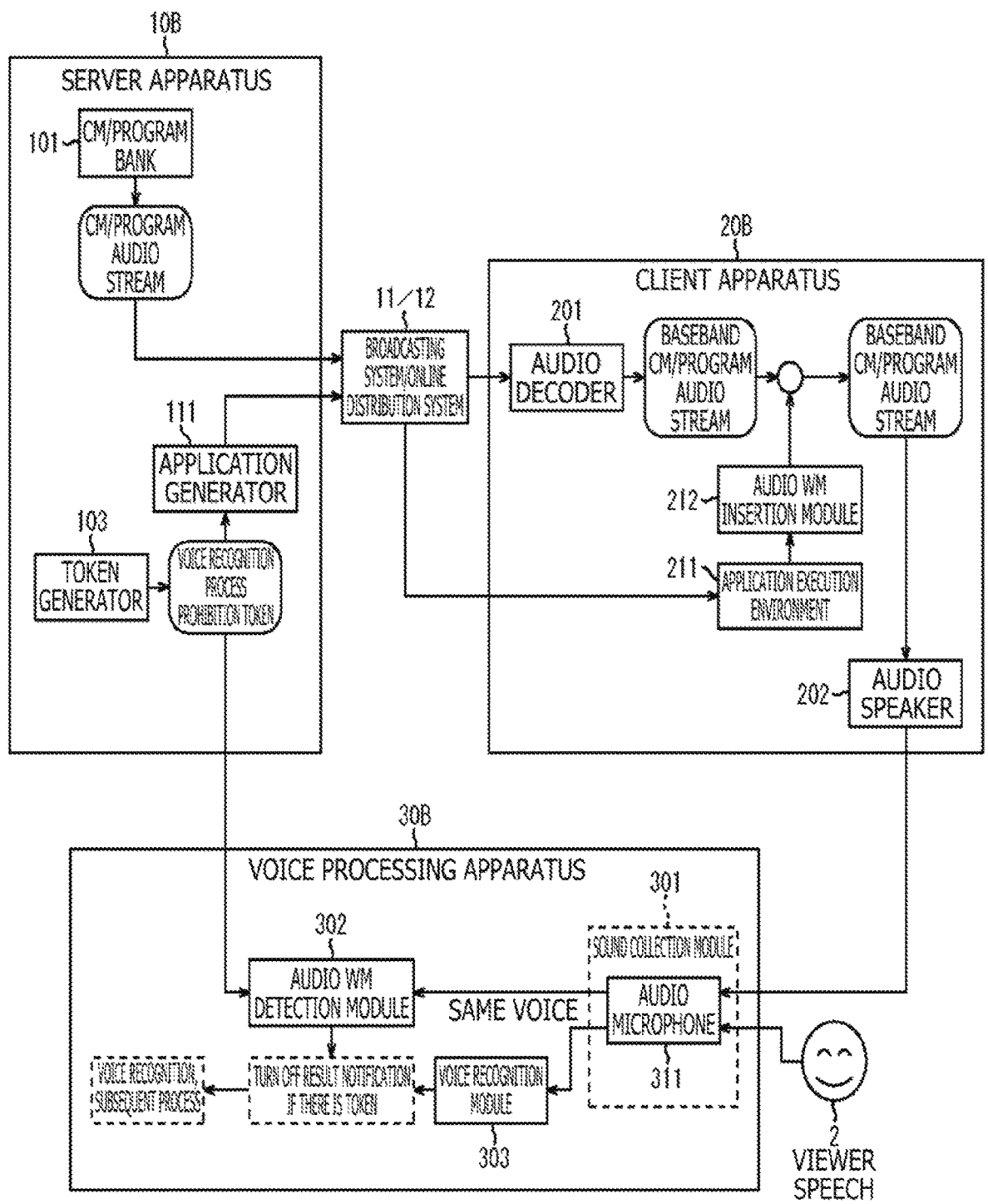
FIG. 8 is a block diagram illustrating a second example of the configuration of the content/voice AI coordination system according to the first embodiment.

FIG. 8 is a block diagram illustrating a second example of the configuration of the content/voice AI coordination system 1 of the first embodiment.

The content/voice AI coordination system 1 of FIG. 8 includes a server apparatus 10B, a client apparatus 20B, and a voice processing apparatus 30B.

Note that in the configuration of the content/voice AI coordination system 1 of FIG. 8, the same reference signs are provided to the parts corresponding to the configuration of the content/voice AI coordination system 1 of FIG. 3 described above. The description will be appropriately skipped to prevent the repetition of the description.

In FIG. 8, the server apparatus 10B includes the CM/program bank 101, the token generator 103, and an application generator 111.

In other words, compared to the server apparatus 10A of FIG. 3, the server apparatus 10B of FIG. 8 is additionally provided with the application generator 111 in place of the audio decoder 102, the audio WM insertion module 104, and the audio encoder 105.

The application generator 111 generates an application based on app generation data. In addition, the application generator 111 uses hard coding to embed the voice recognition process prohibition token generated by the token generator 103 in generating the application.

Furthermore, the server apparatus 10B transmits the application generated by the application generator 111 to the broadcasting system 11 or the online distribution system 12 according to the distribution system of the application.

The broadcasting system 11 transmits, as a broadcast wave, data of at least one of the CM/program stream or the application transmitted from the server apparatus 10B. In addition, the online distribution system 12 distributes, through the Internet 50, the data of at least one of the CM/program stream or the application transmitted from the server apparatus 10B.

The client apparatus 20B receives the CM/program stream and the application distributed by the broadcasting system 11 or the online distribution system 12. In FIG. 8, the client apparatus 20B includes the audio decoder 201, the audio speaker 202, an application execution environment 211, and an audio WM insertion module 212.

In other words, compared to the client apparatus 20A of FIG. 3, the client apparatus 20B of FIG. 8 is additionally provided with the application execution environment 211 and the audio WM insertion module 212.

The application execution environment 211 executes the application received from the broadcasting system 11 or the online distribution system 12. Here, hard coding is used to embed the voice recognition process prohibition token in the application, and the application execution environment 211 acquires the voice recognition process prohibition token and supplies the voice recognition process prohibition token to the audio WM insertion module 212.

The audio WM insertion module 212 inserts (encodes), as an audio watermark, the voice recognition process prohibition token supplied from the application execution environment 211 into the baseband CM/program audio stream supplied from the audio decoder 201 and supplies the baseband CM/program audio stream to the audio speaker 202.

The audio speaker 202 outputs the voice corresponding to the baseband CM/program audio stream supplied from the audio WM insertion module 212 (stream in which the voice recognition process prohibition token is inserted as an audio watermark on the reception side).

Note that the voice processing apparatus 30B of FIG. 8 has a configuration similar to the voice processing apparatus 30A of FIG. 3, and the description will not be repeated here. However, the voice processing apparatus 30B on the local side may coordinate with the server apparatus 40 on the cloud side, and the server apparatus 40 may execute part of the processes of the voice AI assistance service.

(Flow of Content/Voice AI Coordination Process)

Next, a flow of the CM/program and voice AI coordination in the case where the watermark is inserted on the reception side will be described with reference to flow charts of FIGS. 9 and 10.

Figure 9:
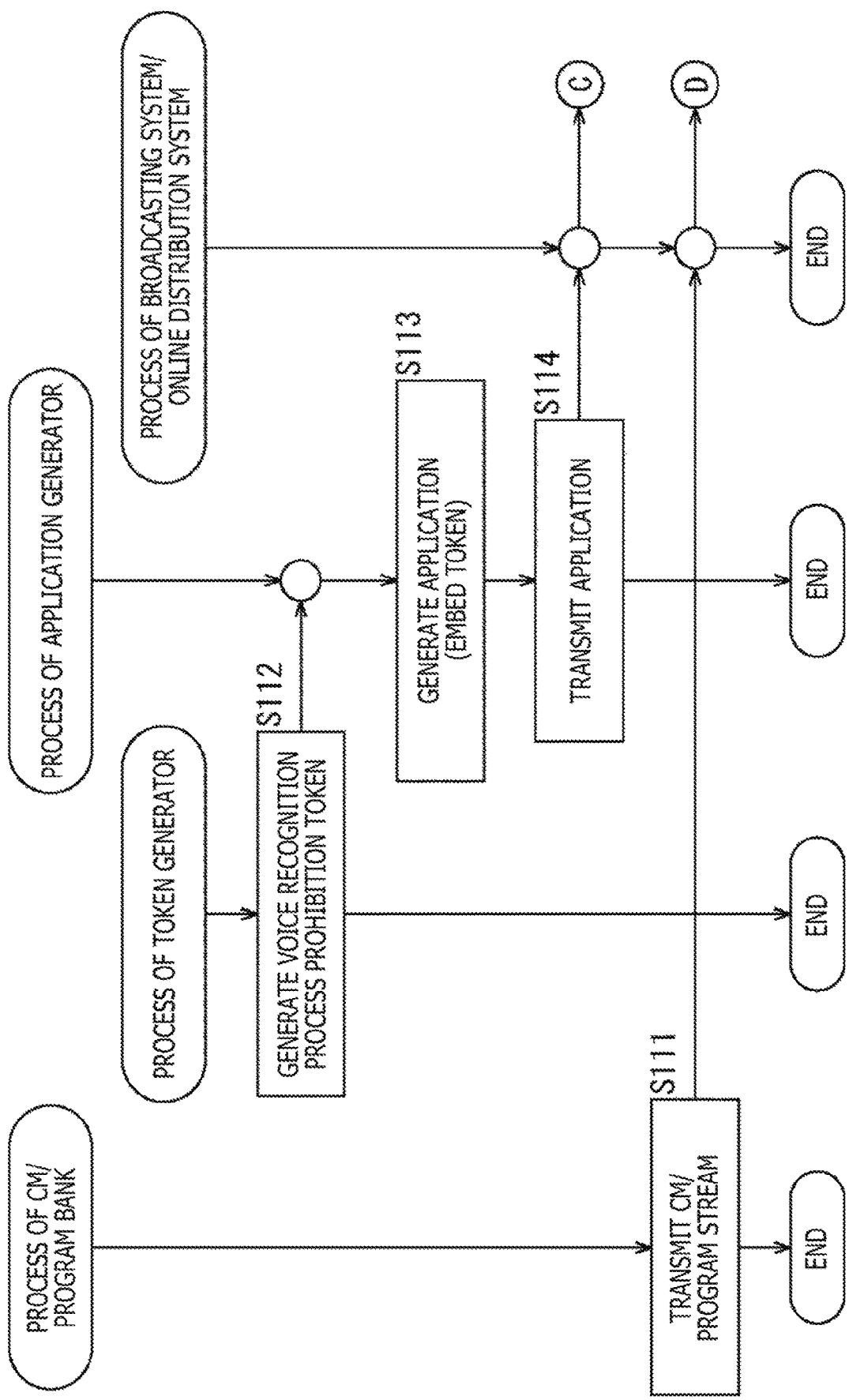
FIG. 9 is a flow chart describing a flow of CM/program and voice AI coordination in a case where the watermark is inserted on a reception side.

Note that FIG. 9 is a flow chart illustrating a flow of the process on the transmission side executed by the server apparatus 10B and one of the broadcasting system 11 and the online distribution system 12. On the other hand, FIG. 10 is a flow chart illustrating a flow of the process on the reception side executed by the client apparatus 20B and the voice processing apparatus 30B.

In step S111, the CM/program bank 101 transmits a CM/program stream stored in the CM/program bank 101 to the broadcasting system 11 or the online distribution system 12. Note that the voice corresponding to the CM/program audio stream includes voice for which the voice recognition process should be prohibited.

In step S112, the token generator 103 generates a voice recognition process prohibition token based on the token generation data.

In step S113, the application generator 111 generates an application based on the app generation data. Here, hard coding can be used to embed the voice recognition process prohibition token obtained in the process of step S112 in generating the application.

Note that although hard coding is used to embed the voice recognition process prohibition token into the application in the case illustrated here, the voice recognition process prohibition token may be acquired from the server apparatus 10B (token generator 103 of the server apparatus 10B) on the transmission side through the Internet 50 when, for example, the client apparatus 20B on the reception side executes the application.

In step S114, the application generator 111 transmits the application obtained in the process of step S113 to the broadcasting system 11 or the online distribution system 12.

In this way, the CM/program stream and the application obtained by the server apparatus 10B are transmitted to the broadcasting system 11 or the online distribution system 12 according to the distribution system of the content.

In other words, in the case where the CM/program stream and the application are distributed through broadcasting, the broadcasting system 11 processes the CM/program stream and the application transmitted from the server apparatus 10B and transmits, as a broadcast wave, the data obtained as a result of the process.

Furthermore, in the case where the CM/program stream and the application are distributed through communication, the online distribution system 12 processes the CM/program stream and the application transmitted from the server apparatus 10B and distributes the data obtained as a result of the process through the Internet 50.

Note that there is a case in which the CM/program stream and the application are multiplexed with the same broadcasting stream. In another case, the CM/program stream may be distributed through broadcasting, and the application may be distributed through communication. In this case, the client apparatus 20B on the reception side accesses the online distribution system 12 just before or at the same time as the start of the CM or the program through the Internet 50 to acquire the application.

Figure 10:
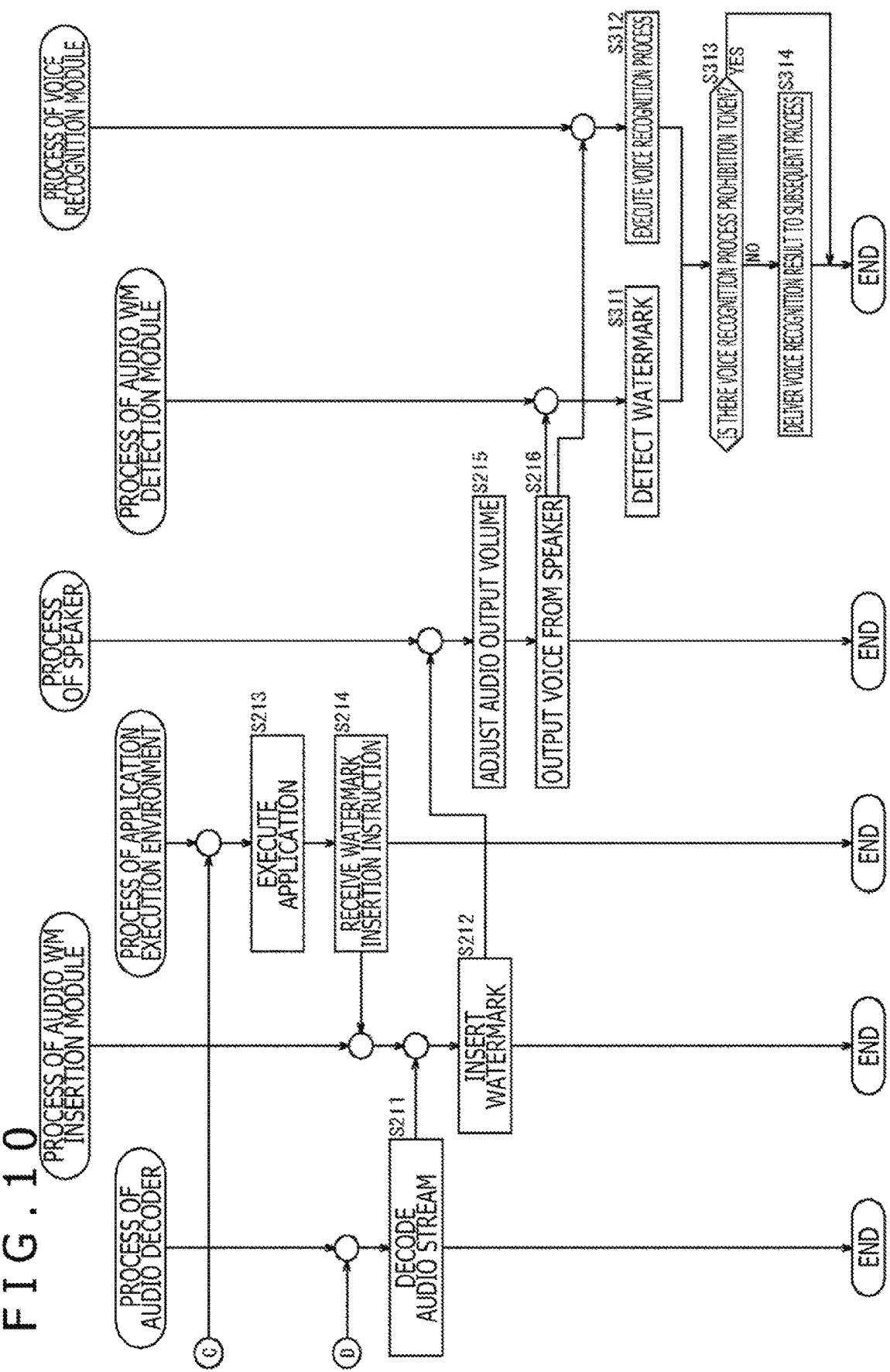
FIG. 10 is a flow chart describing the flow of the CM/program and voice AI coordination in the case where the watermark is inserted on the reception side.

In FIG. 10, the CM/program stream and the application distributed by the broadcasting system 11 or the online distribution system 12 are received by the client apparatus 20B. In the client apparatus 20B, the CM/program stream is processed, and the CM/program audio stream is input to the audio decoder 201. In addition, the application is input to the application execution environment 211.

In step S211, the audio decoder 201 decodes the CM/program audio stream. As a result of the decoding, a baseband CM/program audio stream is obtained.

In step S213, the application execution environment 211 executes the application. Here, hard coding is used to embed the voice recognition process prohibition token into the application, and the application execution environment 211 can acquire the voice recognition process prohibition token.

In this case, the application displays, for example, the above-described confirmation message 251 illustrated in FIG. 7. Therefore, the application does not arbitrarily insert the watermark, and the insertion process of the audio watermark can be executed after the intention of the viewer 2 is checked once.

In the case where the arbitrary use of the voice AI assistance service using the voice of the CM is not permitted in response to the confirmation message 251 of FIG. 7, the viewer 2 operates the "NG button," and the application execution environment 211 receives a watermark insertion instruction (S214). In this case, the process of inserting the audio watermark is executed.

Here, if, for example, the intention of the viewer 2 is checked before the start of the CM or every time the program is selected, the viewer 2 may feel cumbersome. Therefore, instead of successively checking the intention of the viewer 2, the intention may be checked in advance in an initial setting menu or the like, and the viewer intention information may be stored in an initial setting database that can be referenced by the application executed by the application execution environment 211.

In this case, for example, a menu "restrict the arbitrary use of the voice AI assistance service" may be added to the initial setting menu, and the dialog as illustrated in FIG. 7 may be displayed for the viewer 2 to check the arbitrary use of the voice AI assistance service using the voice of the CM. In this way, the application can refer to the initial setting database to control whether or not to insert the watermark based on the viewer intention information, instead of displaying the confirmation message 251 illustrated in FIG. 7 every time.

Note that although the examples of displaying the confirmation message 251 illustrated in FIG. 7 and referring to the initial setting database to use the viewer intention information are described here, other implementation is also possible. For example, the audio watermarks may be inserted in all sections of the CM or the program.

In step S212, the audio WM insertion module 212 inserts (encodes), as an audio watermark, the voice recognition process prohibition token obtained in the process of step S213 into the baseband CM/program audio stream obtained in the process of step S211.

Here, the client apparatus 20B adjusts the audio output volume of the audio speaker 202 so that the volume output from the audio speaker 202 becomes sufficient (S215). Here, the audio speaker 202 is controlled so that the volume is set to a level that allows the audio microphone 311 included in the voice processing apparatus 30B to collect sound.

In step S216, the audio speaker 202 outputs the voice corresponding to the baseband CM/program audio stream obtained in the process of step S212 (stream in which the voice recognition process prohibition token is inserted as an audio watermark on the reception side).

Note that although only the CM/program audio stream is described here to simplify the description, the video decoder also decodes the CM/program video stream in the client apparatus 20B, and the video of the CM or the program corresponding to the baseband CM/program audio stream is displayed on the display.

The voice output from the audio speaker 202 of the client apparatus 20B is collected by the audio microphone 311 of the voice processing apparatus 30B.

In steps S311 to S314, as in steps S301 to S304 of FIG. 5, whether or not the voice recognition process prohibition token notified by the server apparatus 10B is inserted as an audio watermark inserted into the audio stream is determined based on the detection result of the audio watermark.

Furthermore, in a case where it is determined that the voice recognition process prohibition token is not inserted as an audio watermark, the voice recognition result is delivered to the subsequent process (S314). On the other hand, in a case where it is determined that the voice recognition process prohibition token is inserted as an audio watermark, the voice recognition result is not delivered to the subsequent process.

The flow of the content/voice AI coordination process in the case where the watermark is inserted on the reception side has been described.

Figure 6:
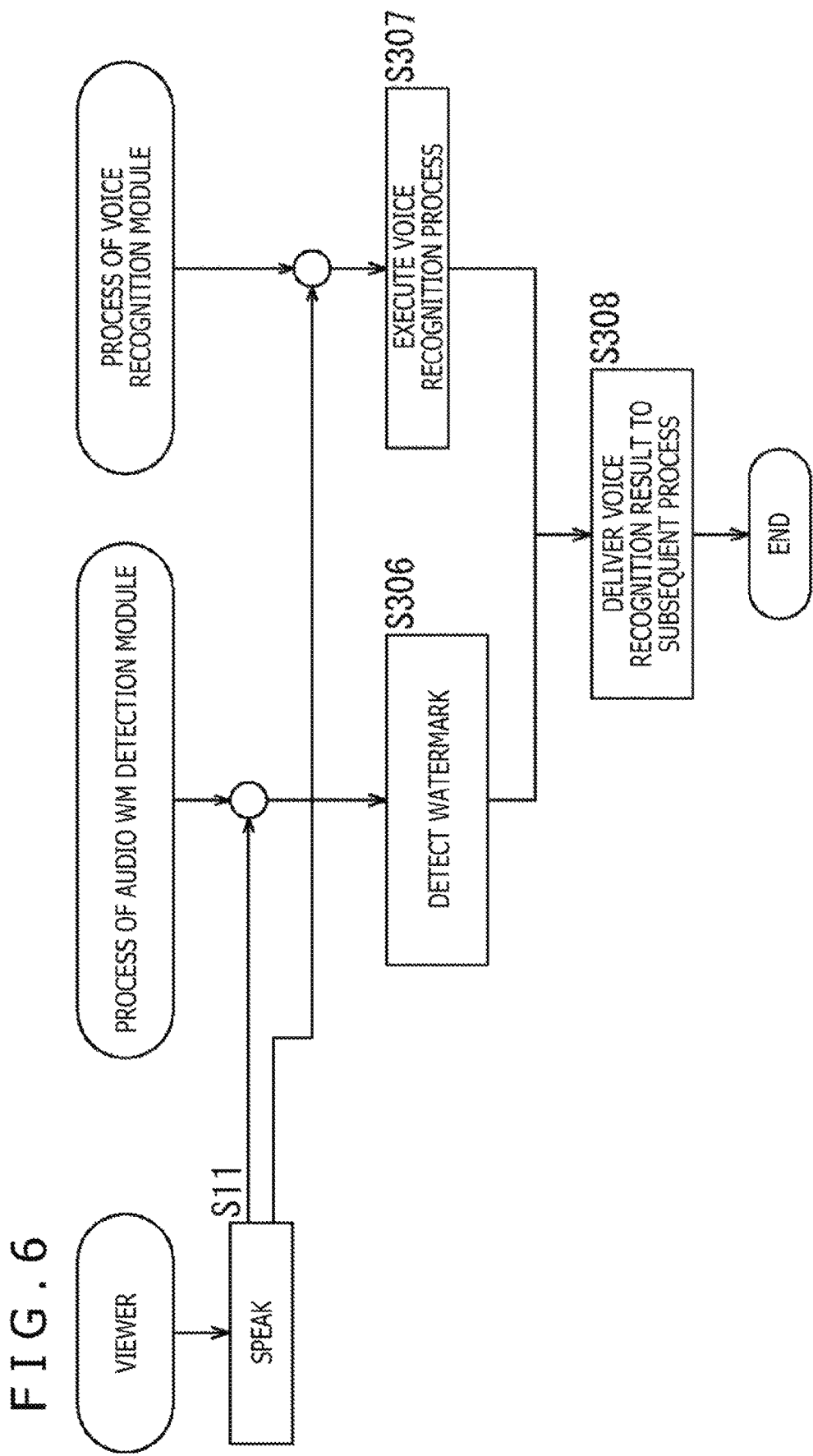
FIG. 6 is a flow chart describing a flow of a voice AI process corresponding to viewer speech.

Note that the voice AI process corresponding to the viewer speech executed by the voice processing apparatus 30B of FIG. 8 is similar to the above-described voice AI process corresponding to the viewer speech of FIG. 6, and the description will not be repeated here.

The first embodiment has been described. In the first embodiment, the server apparatus 10 on the transmission side or the client apparatus 20 on the reception side inserts the voice recognition process prohibition token as an audio watermark, and the voice processing apparatus 30 on the local side or the server apparatus 40 on the cloud side detects the voice recognition process prohibition token. In this way, the validity of the data as a target of voice recognition can be checked to use the voice AI assistance service. As a result, a more practical voice AI assistance service can be provided.

Furthermore, adopting the configuration of the first embodiment can avoid the cost of developing the wording of the voice recognition process prohibition as a blacklist in the database and checking the availability of the wording in real time in the voice AI assistance service. In other words, in a case where the blacklist is frequently updated, and the amount of data is enormous, the cost may suppress the operating cost. Furthermore, it is likely that this will degrade the performance of the voice AI assistance service.

Furthermore, the command for using the voice AI assistance service through the speech of the viewer and the command for using the voice AI assistance service output through the client apparatus 20, such as a television receiver and a mobile receiver, can be distinguished, and this can prevent meaningless (disadvantageous) use of service for the viewer.

In addition, a plurality of types of tokens can be prepared, or the application executed by the client apparatus 20 on the reception side (for example, television receiver side) can execute the process of inserting the watermark. By implementing the configuration, the intention of the viewer can be reflected on whether or not to allow the arbitrary use of the voice AI assistance service uttered from the CM or program under the control of a business operator on the transmission side (for example, broadcasting station or entity of voice AI assistance service).

Note that although the method described above is equivalent to managing the wording of the voice recognition process prohibition of the voice AI assistance service in the blacklist, a method equivalent to managing the wording of the voice recognition process prohibition of the voice AI assistance service in a white list may also be applied here.

For example, to always validate the handling process of the voice recognition result of the voice that can be applied to the voice recognition process of the voice AI assistance service, for which it is known that the voice is included only in a section of a CM or a program, that is, for which the broadcasting station side and the entity side of the voice AI assistance service agree with each other after this fact is announced in advance to the broadcasting station side and the entity side, the following process can be executed to realize the method, for example.

In other words, it is sufficient that the server apparatus 10 on the transmission side (broadcasting station side) decodes the audio stream of the voice in all sections of the CM or the program except for the section of the CM or the program (section in which the handling process of the voice recognition result is always valid) to thereby obtain a baseband audio stream, and the voice recognition process prohibition token generated by the token generator 103 is inserted as an audio watermark.

In addition, the audio stream of the voice in the section of the CM or the program (section in which the handling process of the voice recognition result is always valid) may be decoded here to obtain a baseband audio stream, and a voice recognition process permission token may be inserted as an audio watermark. In other words, it can be stated that, as opposed to the voice recognition process prohibition token described above, the voice recognition process permission token is a token for continuing the subsequent process based on the voice recognition result of the audio stream in a case where the voice recognition process permission token is included in the collected voice.

This can avoid the cost of developing the wording of the voice recognition process permission as a white list in the database and checking the availability of the wording in real time in the voice AI assistance service. In other words, in a case where the white list is frequently updated by frequent generation and update of the wording of the voice recognition process permission, and the amount of data is enormous, the cost may suppress the operating cost. Furthermore, it is likely that this will degrade the performance of the voice AI assistance service.

(2) Second Embodiment

In a use case illustrated here, how the viewer can speak to the voice AI assistance service is presented by television broadcasting of a CM, a program, or the like. For example, in a case where the character string obtained by combining the launch phrase (Launch phrase), the skill name, and the Utterance is significantly long in the example of Alexa (registered trademark) described above, the viewer may be prompted to speak, for example, "ask, Drama Facts, for any private information on the casts of XXXDRAMA by XXXCHANNEL."

Furthermore, in the case where the combined character string of the launch phrase and the like becomes significantly long, the viewer may be prompted to speak, for example, "ask, shoppingApp, my personal account number is 1234567890." However, in the example of the speech, all or part of the speech (for example, the part "1234567890") is generated by the application executed by the client apparatus 20 (for example, television receiver or the like) at viewer's home in the illustrated case.

In this case, when, for example, the phrase is too long so that the viewer cannot memorize the phase or when the service requires speech of details regarding privacy or security, means for avoiding these is necessary.

Furthermore, to protect privacy, peaking or falsification of the token needs to be prevented before the token reaches the sound collection module of the voice AI assistance service or on the route to the subsequent process of the voice AI assistance service. Here, there is obviously a case in which, regardless of the protection of privacy, the message needs to be hidden on the route from the token generator to the subsequent process of the voice AI assistance service.

The present technique proposes a second embodiment, in which a parameter to be delivered to the voice AI assistance service in coordination with the content is inserted as an audio watermark into the audio stream of the content.

In other words, in the second embodiment, the voice processing apparatus 30 provided on the local side as a sound collection device of the voice AI assistance service or the server apparatus 40 provided on the cloud side that analyzes the collected audio stream has a watermark detection function.

As a result, in a case where a token (service delivery parameter) is included as an audio watermark in the collected voice, the token detected as an audio watermark (service delivery parameter) can be delivered to the subsequent process based on the voice recognition result of the audio stream.

Note that although there are various systems of audio watermark, any system can be used as long as necessary and sufficient tokens can be superimposed on the target audio stream.

(Example of Service Delivery Parameter)

Figure 11:
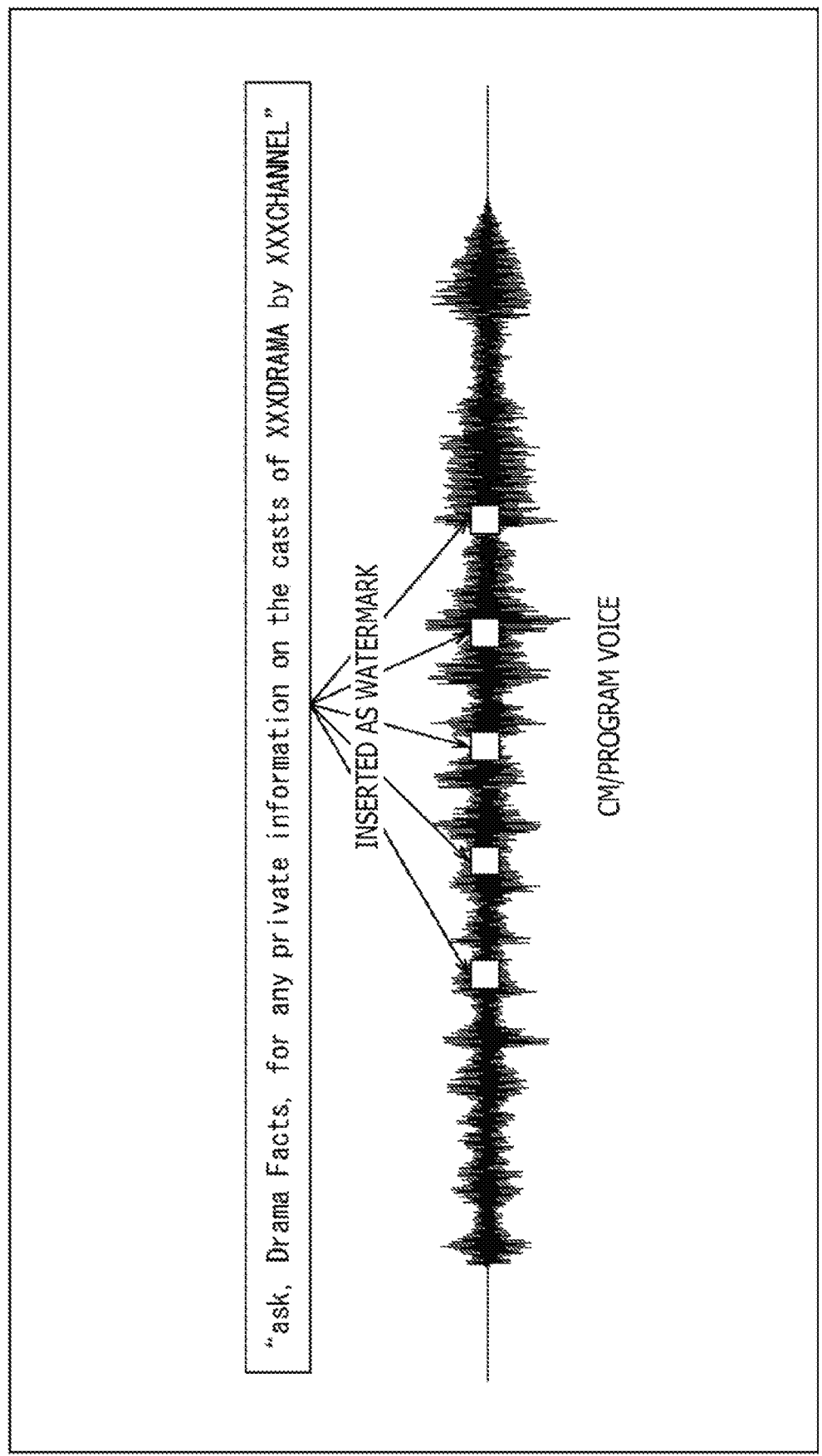
FIG. 11 is a diagram illustrating an example of a service delivery parameter embedded as an audio watermark into a baseband audio stream.

FIG. 11 is a diagram illustrating an example of the service delivery parameter embedded as an audio watermark into the baseband audio stream.

For example, the viewer is instructed to speak a character string indicating how the viewer can speak to the voice AI assistance service in a CM or a program (or part of the CM or the program), such as "ask, Drama Facts, for any private information on the casts of XXXDRAMA by XXXCHANNEL," in an illustrated case.

In this case, the server apparatus 10 on the transmission side (broadcasting station side) decodes the audio stream of a time section of the target CM or program before transmitting the stream of the CM or the program and obtains the baseband audio stream. In addition, the audio WM insertion module of the server apparatus 10 inserts, as an audio watermark, the token (service delivery parameter) generated by the token generator into the baseband audio stream.

Here, a service delivery parameter "ask, Drama Facts, for any private information on the casts of XXXDRAMA by XXXCHANNEL" is generated as a token, and the token is inserted as an audio watermark into the baseband audio stream. Note that the service delivery parameter is repeatedly embedded for a plurality of times and inserted into the baseband audio stream.

Note that here, to hide the details or prevent falsification of the token (delivery parameter) inserted as an audio watermark, the token can be inserted as an audio watermark after encrypting the details (message) of the token or generating a signature for detecting falsification.

For example, as illustrated in FIG. 12, details (message) of the token "ask, Drama Facts, for any private information on the casts of XXXDRAMA by XXXCHANNEL" is stored in a Message element. In addition, for example, XML encryption, an XML signature, or the like can be applied to the message stored in the Message element to hide the details of the token or prevent falsification.

FIG. 13 illustrates an example of a case in which the XML signature is applied to the above-described message stored in the Message element. Here, the XML signature is a type of electronic signature provided to electronic data, such as an XML (Extensible Markup Language) document.

In the example of FIG. 13, URI="" that is an attribute value of a ds:Reference element indicates that the entire Message element is to be signed. Furthermore, in the example of FIG. 13, the description of <ds:Transform Algorithm= . . . enveloped-signature . . . />removes the ds:Signature element from the target of signature. The entire message to which the XML signature is applied is embedded as an audio watermark.

Note that the service delivery parameter inserted as an audio watermark can be inserted not only by the server apparatus 10 on the transmission side, but also by the client apparatus 20 on the reception side. Therefore, the configuration of inserting the audio watermark on the transmission side and the configuration of inserting the audio watermark on the reception side will be described.

(C) Configuration of Inserting Watermark on Transmission Side (Example of System Configuration)

Figure 14:
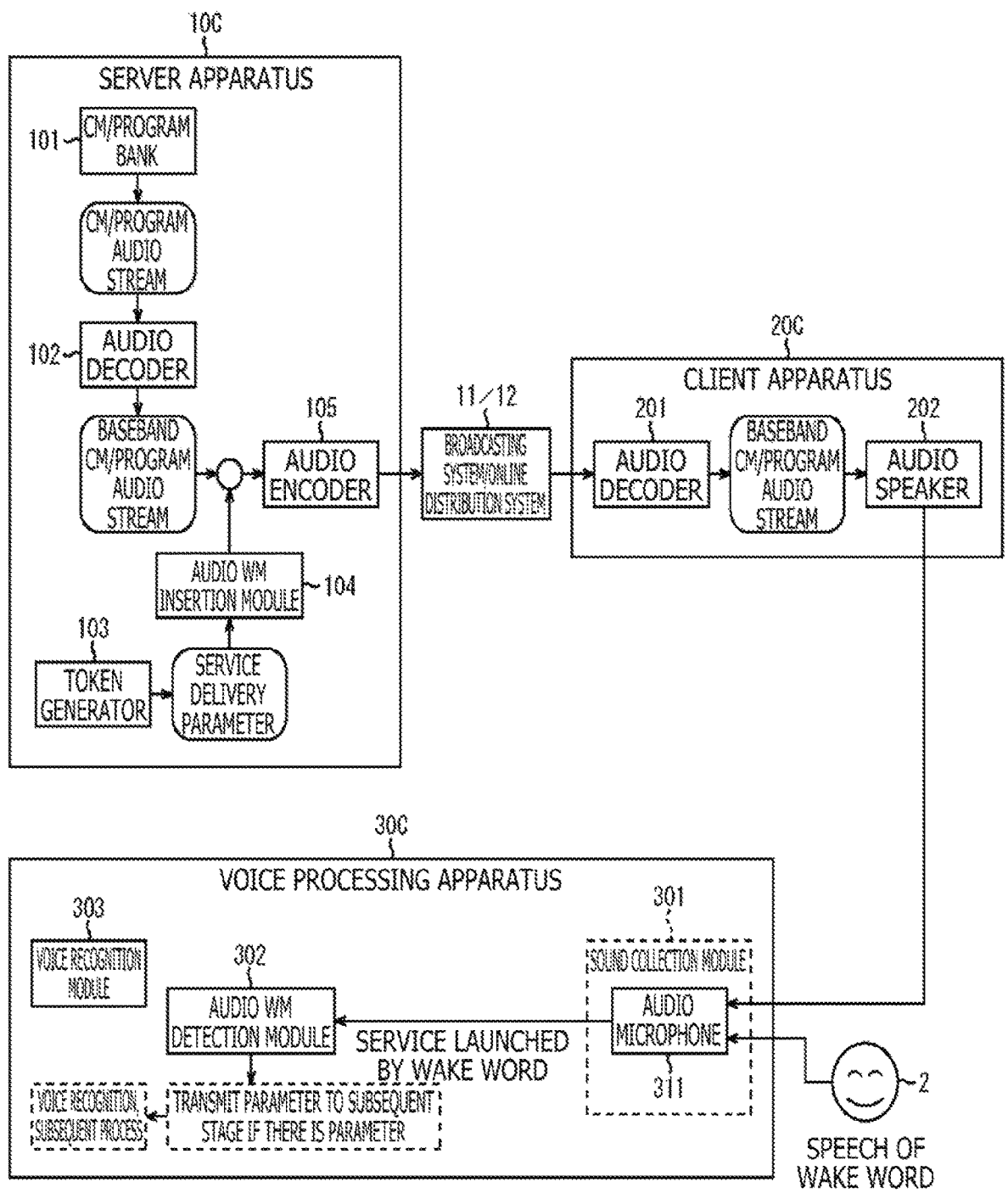
FIG. 14 is a block diagram illustrating a first example of a configuration of the content/voice AI coordination system according to a second embodiment.

FIG. 14 is a block diagram illustrating a first example of the configuration of the content/voice AI coordination system 1 of a second embodiment.

The content/voice AI coordination system 1 of FIG. 14 includes a server apparatus 10C, a client apparatus 20C, and a voice processing apparatus 30C.

Note that in the configuration of the content/voice AI coordination system 1 of FIG. 14, the same reference signs are provided to the parts corresponding to the configurations of the content/voice AI coordination system 1 of FIGS. 3 and 8 described above. The description will be appropriately skipped to prevent the repetition of the description.

In FIG. 14, the server apparatus 10C includes the CM/program bank 101, the audio decoder 102, the token generator 103, the audio WM insertion module 104, and the audio encoder 105.

The token generator 103 generates a service delivery parameter based on the token generation data and supplies the service delivery parameter to the audio WM insertion module 104.

Here, the token generation data is, for example, data for generating a token (service delivery parameter), such as "ask, Drama Facts, for any private information on the casts of XXXDRAMA by XXXCHANNEL." The token generation data corresponds to, for example, the determination of the broadcasting station, the entity of the voice AI assistance service, or other business operators.

The audio WM insertion module 104 inserts (encodes), as an audio watermark, the service delivery parameter supplied from the token generator 103 into the baseband CM/program audio stream supplied from the audio decoder 102 and supplies the baseband CM/program audio stream to the audio encoder 105.

The audio encoder 105 encodes the baseband CM/program audio stream supplied from the audio WM insertion module 104 (stream in which the service delivery parameter is inserted as an audio watermark on the transmission side).

In FIG. 14, the client apparatus 20C includes the audio decoder 201 and the audio speaker 202 as in the client apparatus 20A illustrated in FIG. 3.

Furthermore, the voice processing apparatus 30C includes the sound collection module 301, the audio WM detection module 302, and the voice recognition module 303 as functions of the voice AI assistance service in FIG. 14. In addition, the sound collection module 301 includes the audio microphone 311.

The audio microphone 311 collects a wake word spoken by the viewer 2 or voice output from the audio speaker 202 of the client apparatus 20.

In a case where the speech of the wake word by the viewer 2 is recognized based on the voice collected by the audio microphone 311, the sound collection module 301 launches the voice AI assistance service and validates the detection of the service delivery parameter by the audio WM detection module 302.

The audio WM detection module 302 detects the audio watermark inserted into the audio stream from the audio microphone 311 and determines whether or not the service delivery parameter is inserted as an audio watermark.

In a case where the audio WM detection module 302 determines that the service delivery parameter is inserted as an audio watermark, the audio WM detection module 302 supplies the service delivery parameter as a voice recognition result to the subsequent processing unit that executes the subsequent process. In this case, the subsequent processing unit executes the subsequent process related to the voice AI assistance service based on the voice recognition result supplied from the audio WM detection module 302.

Furthermore, in a case where the audio WM detection module 302 determines that the service delivery parameter is not inserted as an audio watermark, the audio WM detection module 302 does not deliver the voice recognition result to the subsequent processing unit.

The voice recognition module 303 applies the voice recognition process to the audio stream supplied from the audio microphone 311. Note that the voice recognition module 303 may not be provided in the configuration illustrated in FIG. 14.

Here, as for the speech of the wake word by the viewer 2, a speech instruction message 261 as illustrated for example in FIG. 15 can be displayed in the client apparatus 20C to prompt the viewer 2 to speak the wake word for launching the voice AI assistance service.

In FIG. 15, the speech instruction message 261 "If you want to know private information on the casts of the program, just say "Service A"" is displayed. In addition, the viewer 2 confirming the speech instruction message 261 will speak the wake word "Service A."

Note that although the voice processing apparatus 30C on the local side executes all of the processes of the voice AI assistance service in FIG. 14 for the convenience of description, the server apparatus 40 on the cloud side may execute part of the processes of the voice AI assistance service.

For example, in a case where the voice processing apparatus 30C on the local side has the function of the sound collection module 301, and the server apparatus 40 on the cloud side has the functions of the audio WM detection module 302, the voice recognition module 303, and the subsequent processing unit, the voice processing apparatus 30C and the server apparatus 40 coordinate with each other to realize the voice AI assistance service.

In addition, although the token generator 103 is included in the server apparatus 100 in the description of FIG. 14, an apparatus other than the server apparatus 100 may include the token generator 103.

(Flow of Content/Voice AI Coordination Process)

Next, a flow of the content/voice AI coordination process in the case where the watermark is inserted on the transmission side will be described with reference to flow charts of FIGS. 16 and 17.

Figure 16:
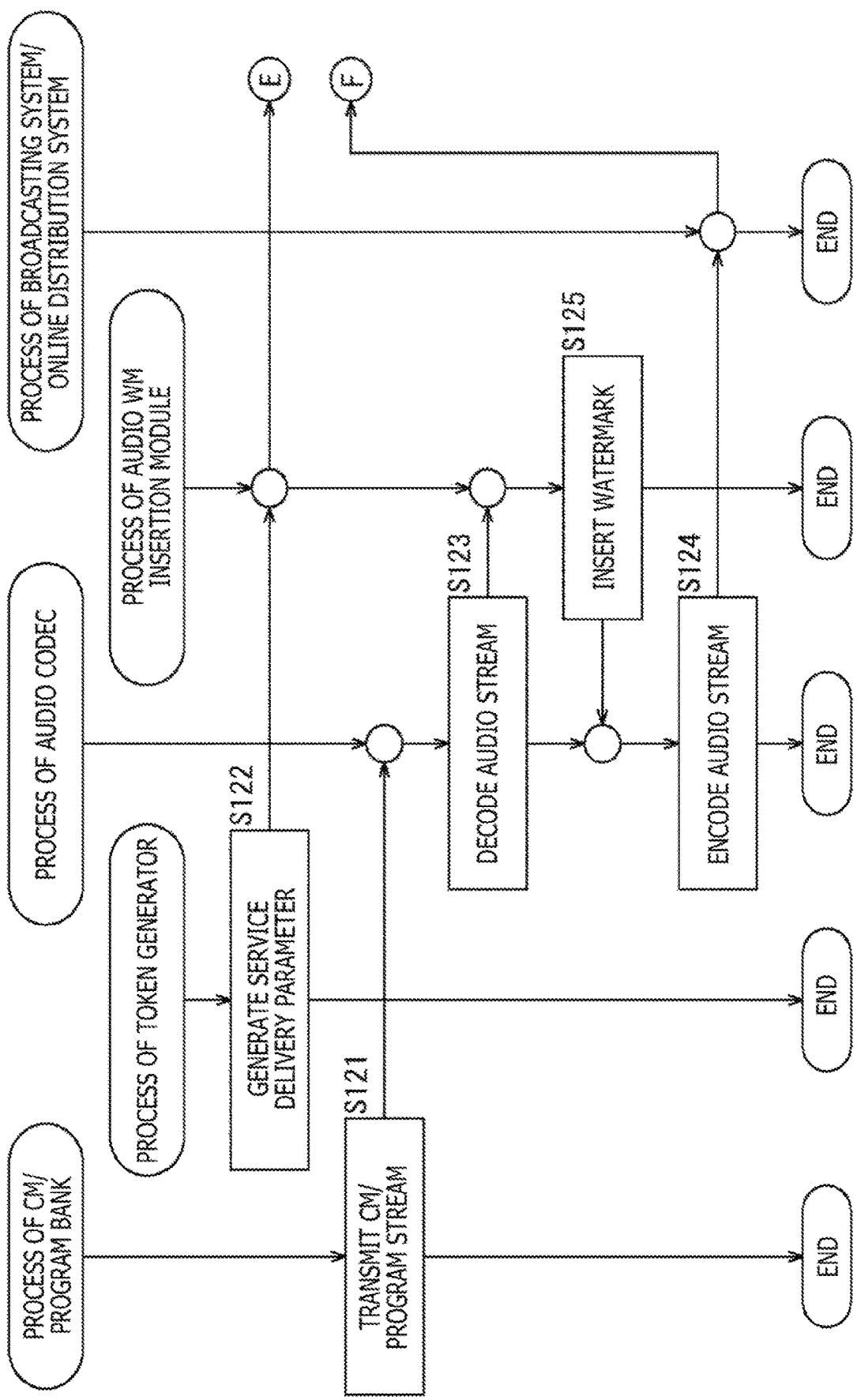
FIG. 16 is a flow chart describing a flow of a content/voice AI coordination process in the case where the watermark is inserted on the transmission side.

Note that FIG. 16 is a flow chart illustrating a flow of the process on the transmission side executed by the server apparatus 10C and one of the broadcasting system 11 and the online distribution system 12. On the other hand, FIG. 17 is a flow chart illustrating a flow of the process on the reception side executed by the client apparatus 20C and the voice processing apparatus 30C.

In step S121, the CM/program bank 101 transmits a CM/program stream. Here, a CM/program audio stream is transmitted to the audio decoder 102.

In step S122, the token generator 103 generates a service delivery parameter as a token based on the token generation data.

Here, for example, a character string (message) "ask, Drama Facts, for any private information on the casts of XXXDRAMA by XXXCHANNEL" indicating how the viewer 2 can speak to the voice AI assistance service is generated as a service delivery parameter. In addition, for example, the XML signature or the like can be applied to the message as described above to hide the details of the token or prevent falsification.

In step S123, the audio decoder 102 decodes the CM/program audio stream transmitted in the process of step S121 and obtains a baseband CM/program audio stream.

In step S125, the audio WM insertion module 104 inserts (encodes), as an audio watermark, the service delivery parameter obtained in the process of step S122 into the baseband CM/program audio stream obtained in the process of step S123.

In step S124, the audio encoder 105 encodes the baseband CM/program audio stream obtained in the process of step S125 in which the audio watermark is inserted.

Note that although only the CM/program audio stream is described here to simplify the description, the CM/program audio stream is multiplexed with another stream, such as a CM/program video stream, as necessary and processed in the server apparatus 10C.

In this way, the CM/program stream obtained by the server apparatus 10C (stream in which the service delivery parameter is inserted as an audio watermark on the transmission side) is transmitted by the broadcasting system 11 or the online distribution system 12 according to the distribution system of the content.

Figure 17:
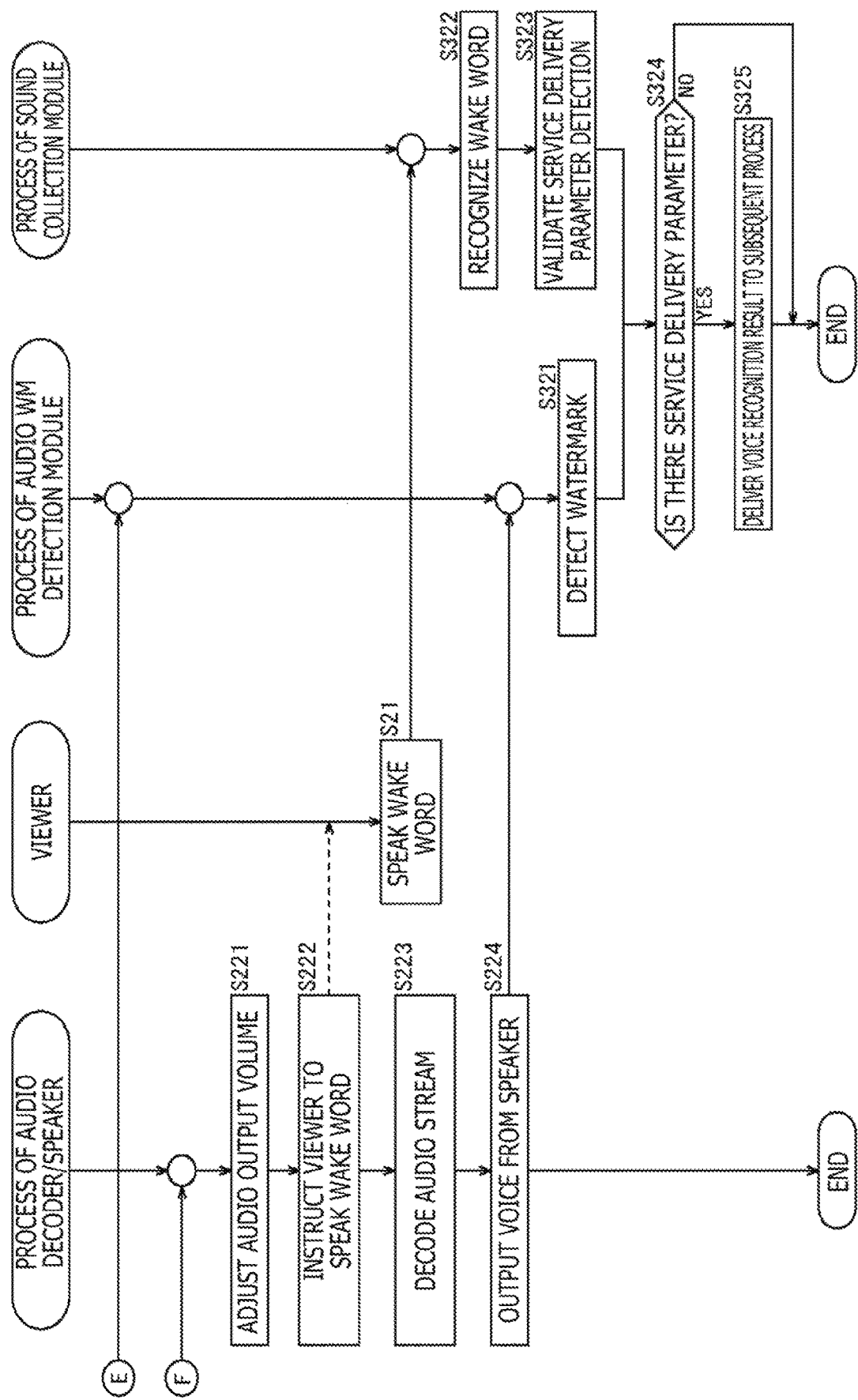
FIG. 17 is a flow chart describing the flow of the content/voice AI coordination process in the case where the watermark is inserted on the transmission side.

In addition, the CM/program stream distributed by the broadcasting system 11 or the online distribution system 12 in FIG. 16 is received by the client apparatus 20C in FIG. 17. In the client apparatus 20C, the CM/program stream is processed, and the CM/program audio stream is input to the audio decoder 201.

Note that the client apparatus 20C adjusts the audio output volume of the audio speaker 202 so that the volume output from the audio speaker 202 becomes sufficient (S221).

Furthermore, in this case, the client apparatus 20C instructs the viewer 2 to speak the wake word (for example, "Service A") for launching the voice AI assistance service (S222).

Here, the client apparatus 20C displays, for example, the speech instruction message 261 (FIG. 15) "If you want to know private information on the casts of the program, just say "Service A"" in the section where the audio watermark is inserted into the audio stream of the CM or the program. In addition, the viewer 2 checking the display will speak the wake word (S21).

In step S223, the audio decoder 201 decodes the CM/program audio stream to obtain the baseband CM/program audio stream.

In step S224, the audio speaker 202 outputs the voice corresponding to the baseband CM/program audio stream obtained in the process of step S223.

Note that although only the CM/program audio stream is described here to simplify the description, the video decoder also decodes the CM/program video stream in the client apparatus 20C, and the video of the CM or the program corresponding to the baseband CM/program video stream is displayed on the display.

The wake word spoken by the viewer 2 and the voice output from the audio speaker 202 of the client apparatus 20C are collected by the audio microphone 311 of the voice processing apparatus 30.

In step S322, the sound collection module 301 recognizes the wake word spoken by the viewer 2 from the audio stream corresponding to the voice collected by the audio microphone 311.

Furthermore, in the case where the wake word is recognized, the sound collection module 301 launches the voice AI assistance service and validates the detection of the service delivery parameter (S323). As a result of the validation of the detection of the service delivery parameter, the process of step S321 is started by the audio WM detection module 302.

In step S321, in step S301, the audio WM detection module 302 detects the audio watermark inserted into the audio stream from the audio microphone 311.

In step S324, the audio WM detection module 302 determines whether or not the service delivery parameter is inserted as an audio watermark inserted into the audio stream based on the detection result obtained in the process of step S321.

In a case where the audio WM detection module 302 determines that the service delivery parameter is inserted as an audio watermark in step S324, the process proceeds to the process of step S325. In step S325, the audio WM detection module 302 delivers, as a voice recognition result, the service delivery parameter obtained in the process of step S321 to the subsequent process.

On the other hand, in a case where the audio WM detection module 302 determines that the service delivery parameter is not inserted as an audio watermark in step S324, the process of step S325 is skipped. In other words, it is assumed that the voice recognition result of the audio stream is invalid in this case, and the voice recognition result is not delivered to the subsequent process (nothing is done).

In this way, in a case where, for example, the character string (message) "ask, Drama Facts, for any private information on the casts of XXXDRAMA by XXXCHANNEL" is inserted as a service delivery parameter into the audio stream, the voice processing apparatus 30C delivers the message as a voice recognition result to the subsequent process. This can prevent a situation in which, for example, the phrase is too long so that the viewer 2 using the voice AI assistance service cannot memorize the phrase.

The flow of the content/voice AI coordination process in the case where the watermark is inserted on the transmission side has been described.

(D) Configuration of Inserting Watermark on Reception Side

Although the server apparatus 10 on the transmission side (broadcasting station side) executes the process of inserting the watermark in the case described above, the client apparatus 20 on the reception side (for example, television receiver) may execute the process. In the case where the client apparatus 20 on the reception side executes the process of inserting the watermark, an application, such as a broadcasting application associated with broadcasting, can be executed to realize the process, for example.

Here, in the case where the server apparatus 10 on the transmission side executes the process of inserting the watermark, the same voice (for example, voice of CM or program) is sent to all viewers, and the intentions of individual viewers cannot be taken into account to perform the control. However, the client apparatus 20 on the reception side can execute the application to execute the process of inserting the watermark, and this configuration can realize, for example, the following.

In other words, for example, attribute information unique to the viewer (for example, account information or the like of the viewer necessary to purchase the product) regarding the privacy of the viewer can be reflected on the watermark, and this allows personalization.

Hereinafter, the configuration and a flow of the process in the case where the client apparatus 20 on the reception side inserts the watermark will be illustrated.

(Example of System Configuration)

Figure 18:
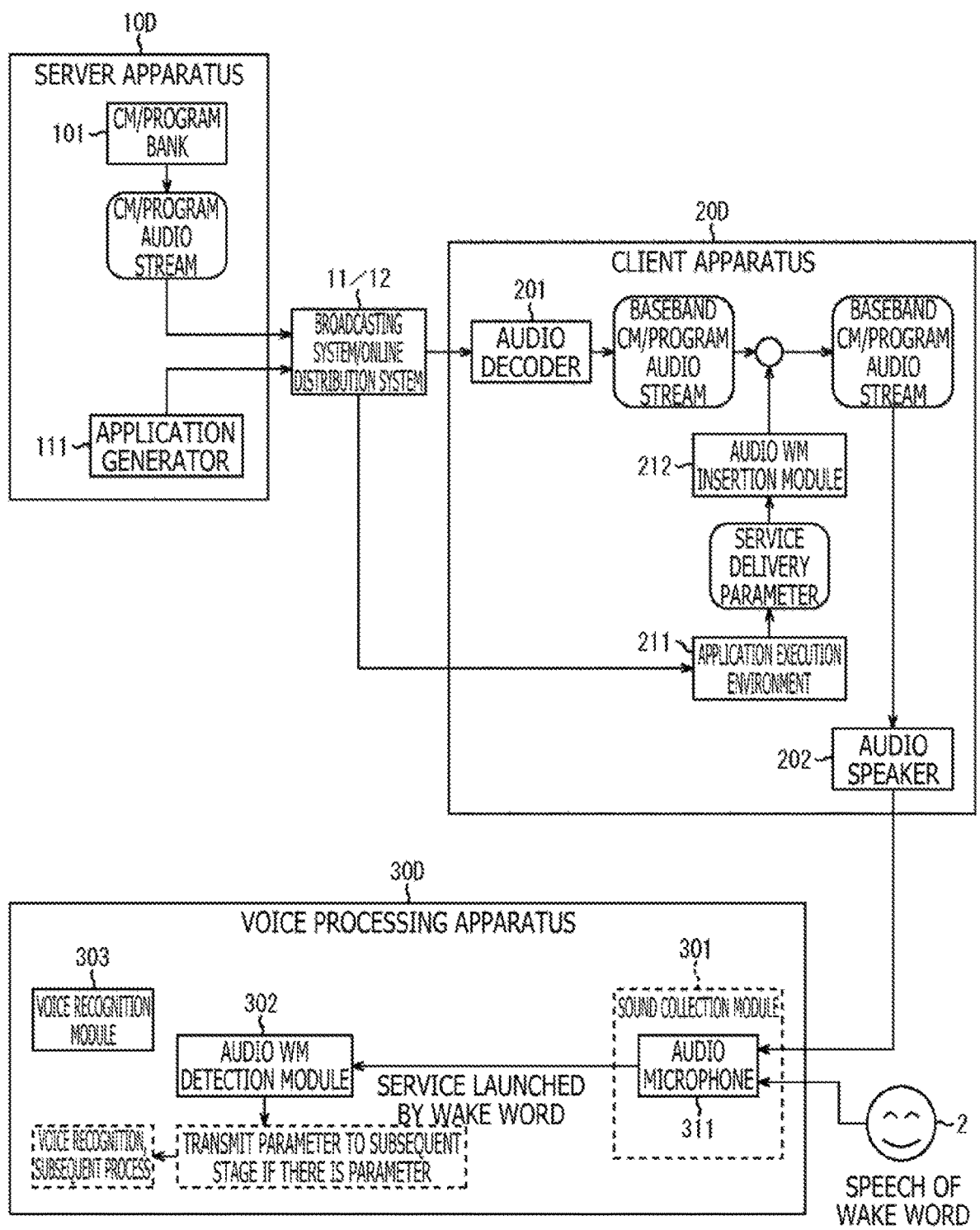
FIG. 18 is a block diagram illustrating a second example of the configuration of the content/voice AI coordination system according to the second embodiment.

FIG. 18 is a block diagram illustrating a second example of the configuration of the content/voice AI coordination system 1 according to the second embodiment.

The content/voice AI coordination system 1 of FIG. 18 includes a server apparatus 10D, a client apparatus 20D, and a voice processing apparatus 30D.

Note that in the configuration of the content/voice AI coordination system 1 of FIG. 18, the same reference signs are provided to the parts corresponding to the configurations of the content/voice AI coordination system 1 of FIGS. 3, 8, and 14 described above. The description will be appropriately skipped to prevent the repetition of the description.

In FIG. 18, the server apparatus 10D includes the CM/program bank 101 and the application generator 111.

The application generator 111 generates an application based on the app generation data. The application generated here has a token generator function (function equivalent to the token generator 103 described above).

In addition, the server apparatus 10D transmits the application generated by the application generator 111 to the broadcasting system 11 or the online distribution system 12 according to the distribution system of the application.

In FIG. 18, the client apparatus 20D includes the audio decoder 201, the audio speaker 202, the application execution environment 211, and the audio WM insertion module 212.

The application execution environment 211 executes the application received from the broadcasting system 11 or the online distribution system 12. Here, the application has the token generator function, and the token (service delivery parameter) generated by the application is supplied to the audio WM insertion module 212.

The audio WM insertion module 212 inserts (encodes), as an audio watermark, the service delivery parameter generated by the application of the application execution environment 211 into the baseband CM/program audio stream supplied from the audio decoder 201 and supplies the baseband CM/program audio stream to the audio speaker 202.

The audio speaker 202 outputs the voice corresponding to the baseband CM/program audio stream (stream in which the service delivery parameter is inserted as an audio watermark on the reception side) supplied from the audio WM insertion module 212.

Note that the voice processing apparatus 30D of FIG. 18 has a configuration similar to the voice processing apparatus 30C of FIG. 14, and the configuration will not be described here. However, the voice processing apparatus 30D on the local side may coordinate with the server apparatus 40 on the cloud side, and the server apparatus 40 may execute part of the processes of the voice AI assistance service.

Here, as for the speech of the wake word spoken by the viewer 2 to the voice processing apparatus 30D, a speech instruction message 271 as illustrated for example in FIG. 19 can be displayed in the client apparatus 20D to prompt the viewer 2 to speak the wake word for launching the voice AI assistance service.

In FIG. 19, the speech instruction message 271 "If you want to purchase the product introduced in the program, just say "Service A"" is displayed. In addition, the viewer 2 confirming the speech instruction message 271 will speak the wake word "Service A."

(Flow of Content/Voice AI Coordination Process)

Next, a flow of the content/voice AI coordination process in the case where the watermark is inserted on the reception side will be described with reference to flow charts of FIGS. 20 and 21.

Figure 20:
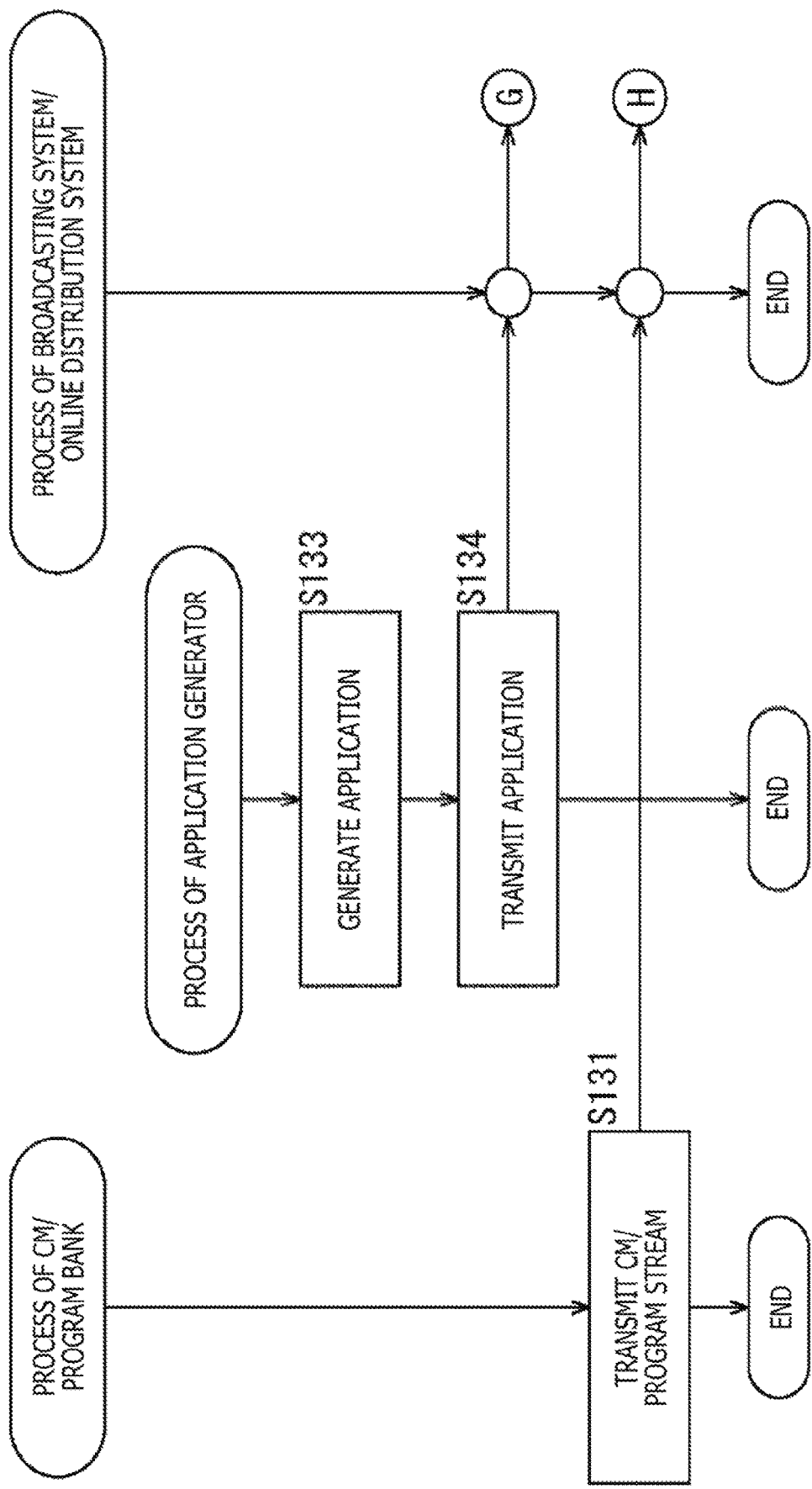
FIG. 20 is a flow chart describing a flow of CM/program and voice AI coordination in the case where the watermark is inserted on the reception side.

Note that FIG. 20 is a flow chart illustrating a flow of the process on the transmission side executed by the server apparatus 10D and one of the broadcasting system 11 and the online distribution system 12. On the other hand, FIG. 21 is a flow chart illustrating a flow of the process on the reception side executed by the client apparatus 20D and the voice processing apparatus 30D.

In step S131, the CM/program bank 101 transmits a CM/program stream to the broadcasting system 11 or the online distribution system 12.

In step S133, the application generator 111 generates an application based on the app generation data.

Here, the application has a token generator function (function equivalent to the token generator 103 described above). Note that hard coding may be used to embed part of the service delivery parameter (for example, common information other than the attribute information unique to the viewer) in generating the application.

In step S134, the application generator 111 transmits the application obtained in the process of step S133 to the broadcasting system 11 or the online distribution system 12.

In this way, the CM/program stream and the application obtained by the server apparatus 10D are transmitted by the broadcasting system 11 or the online distribution system 12 according to the distribution system of the content.

Figure 21:
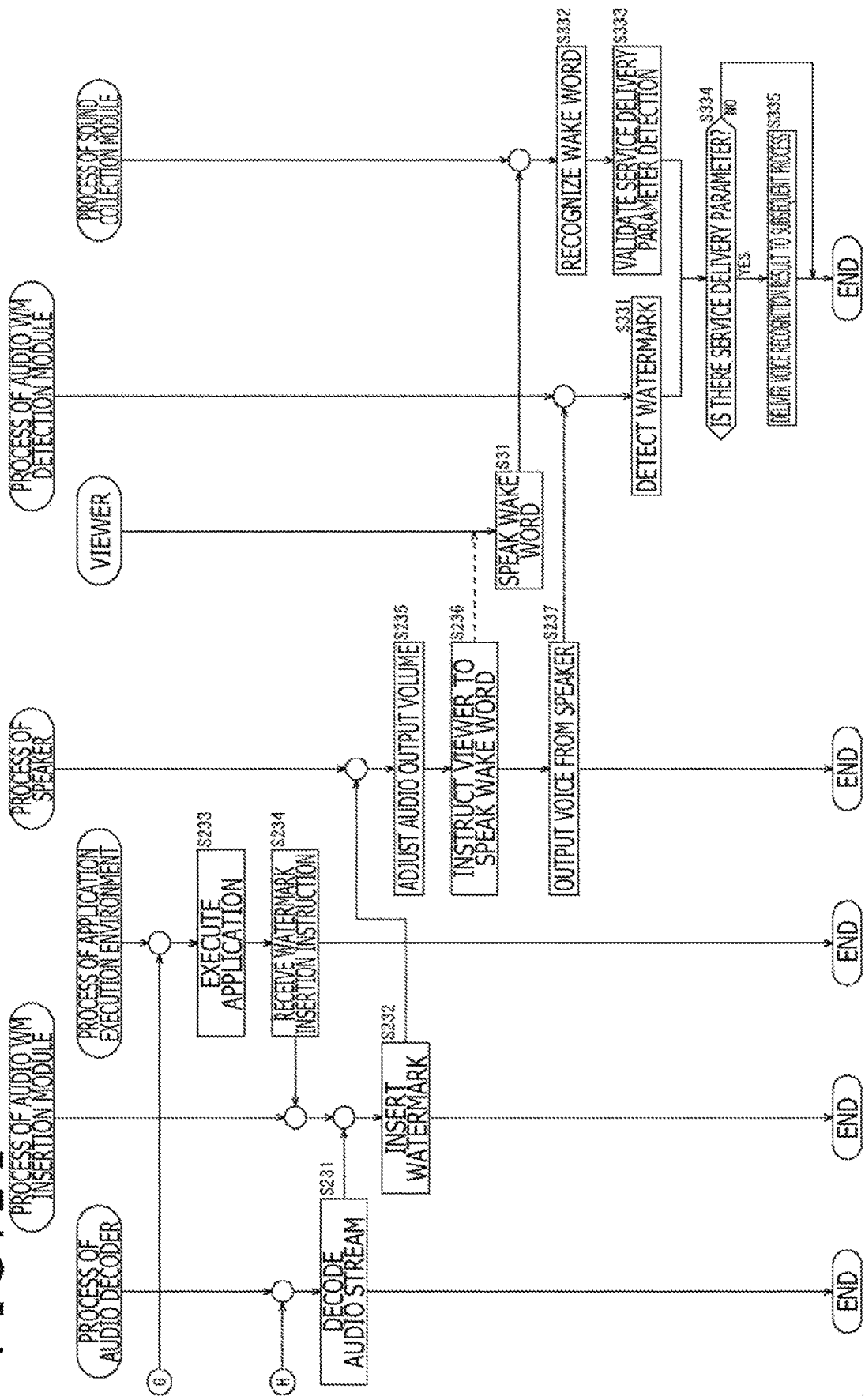
FIG. 21 is a flow chart describing the flow of the CM/program and voice AI coordination in the case where the watermark is inserted on the reception side.

In addition, the CM/program stream and the application distributed by the broadcasting system 11 or the online distribution system 12 in FIG. 20 are received by the client apparatus 20D in FIG. 21. In the client apparatus 20D, the CM/program audio stream is input to the audio decoder 201, and the application is input to the application execution environment 211.

In step S231, the audio decoder 201 decodes the CM/program audio stream and obtains a baseband CM/program audio stream.

In step S233, the application execution environment 211 executes the application. In this case, the application has the token generator function, and the application can generate and acquire the service delivery parameter as a token.

Here, for example, a character string (message) "ask, shoppingApp, my personal account number is 1234567890" indicating how the viewer 2 can speak to the voice AI assistance service is generated as a service delivery parameter.

Note that in generating the service delivery parameter, the application executed by the application execution environment 211 acquires attribute information unique to the viewer (for example, account number "1234567890") regarding the privacy of the viewer 2 from a database (for example, database in which the information specific to the viewer is set in the initial setting menu of the client apparatus 20) and generates the service delivery parameter based on the information.

In this case, for example, the application can display the above-described confirmation message 251 illustrated in FIG. 7, and the application can check the intention of the viewer 2 once and then execute the insertion process of the audio watermark instead of arbitrarily inserting the watermark.

For example, in the case of permitting the arbitrary use of the voice AI assistance service through the voice of the CM or the program in response to the confirmation message 251 of FIG. 7, the viewer 2 operates the "OK button," and the application execution environment 211 receives the watermark insertion instruction (S234). In this case, the process of inserting the audio watermark is executed.

Note that as described above, the intention may be checked in advance, and the viewer intention information may be stored in the initial setting database and used. In addition, the insertion process of the audio watermark may be involuntarily executed instead of executing the process of step S234.

In step S232, the audio WM insertion module 212 inserts (encodes), as an audio watermark, the service delivery parameter obtained in the process of step S233 into the baseband CM/program audio stream obtained in the process of step S231.

Note that the client apparatus 20D adjusts the audio output volume of the audio speaker 202 so that the volume output from the audio speaker 202 becomes sufficient (S235).

Furthermore, in this case, the client apparatus 20D instructs the viewer 2 to speak the wake word (for example, "Service A") for launching the voice AI assistance service (S236).

Here, the client apparatus 20D displays, for example, the speech instruction message 271 (FIG. 19) "If you want to purchase the product introduced in the program, just say "Service A"" in the section where the audio watermark is inserted into the audio stream of the CM or the program. The viewer 2 checking the display will speak the wake word (S31).

In step S237, the audio speaker 202 outputs the voice corresponding to the baseband CM/program audio stream (stream in which the service delivery parameter is inserted as an audio watermark on the reception side) obtained in the process of step S232.

Note that although only the CM/program audio stream is described here to simplify the description, the CM/program video stream is also decoded by the video decoder in the client apparatus 20D, and the video of the CM or the program corresponding to the baseband CM/program video stream is displayed on the display.

The wake word spoken by the viewer 2 and the voice output from the audio speaker 202 of the client apparatus 20D are collected by the audio microphone 311 of the voice processing apparatus 30D.

In steps S331 to S335, in the case where the wake word spoken by the viewer 2 is recognized, the voice AI assistance service is launched, the detection of the service delivery parameter is validated, and whether or not the service delivery parameter is inserted as an audio watermark inserted into the audio stream from the audio microphone 311 is determined, as in steps S321 to S325 of FIG. 17.

Furthermore, in the case where it is determined that the service delivery parameter is inserted as an audio watermark, the service delivery parameter is delivered as a voice recognition result to the subsequent process (S335). On the other hand, in the case where it is determined that the service delivery parameter is not inserted as an audio watermark, the voice recognition result is not delivered to the subsequent process.

In this way, in the case where, for example, the character string (message) "ask, shoppingApp, my personal account number is 1234567890" is inserted as a service delivery parameter into the audio stream, the voice processing apparatus 30D delivers the message as a voice recognition result to the subsequent process. This can avoid a situation in which, for example, the phrase is too long so that the viewer 2 using the voice AI assistance service cannot memorize the phrase, or the viewer 2 is requested to speak details regarding privacy or security.

The flow of the content/voice AI coordination process in the case where the watermark is inserted on the reception side has been described.

The second embodiment has been described. In the second embodiment, the server apparatus 10 on the transmission side or the client apparatus 20 on the reception side inserts the service delivery parameter as an audio watermark, and the voice processing apparatus 30 on the local side or the server apparatus 40 on the cloud side detects the service delivery parameter. In this way, even in a case where the viewer cannot correctly speak as instructed or the instruction includes details that the viewer hesitates to speak, the voice AI assistance service can be accurately used while the security is taken into account. As a result, a more practical voice AI assistance service can be provided.

In this case, whether the viewer speaks the wake word as an indication of the intention of using the voice AI assistance service can be checked, and the use of the voice AI assistance service can be started after the consent of the viewer is obtained.

Here, if the service delivery parameter is not inserted as an audio watermark, the viewer needs to speak, for example, details too long for the viewer to correctly speak as illustrated next.

In other words, in the case of the example of "Configuration of Inserting Watermark on Transmission Side" in (C) described above, a speech instruction message 281 "If you want to know private information on the casts of the program, say "Service A, ask, Drama Facts, for any private information on the casts of XXXDRAMA by XXXCHANNEL"" is displayed as illustrated in FIG. 22, and the viewer needs to speak the long details.

On the other hand, the service delivery parameter is inserted as an audio watermark in the second embodiment. Therefore, for example, the viewer checking the above-described speech instruction message 261 of FIG. 15 needs to simply speak only the wake word "Service A," and this allows correct speech of the viewer.

In addition, if the service delivery parameter is not inserted as an audio watermark, the viewer may hesitate to speak in a case where, for example, the speech details include private information of the viewer as illustrated next.

In other words, in the case of the example of "Configuration of Inserting Watermark on Reception Side" in (D) described above, a speech instruction message 291 "If you want to purchase the product introduced in the program, say "Service A, ask, shoppingApp, my personal account number is 1234567890"" is displayed as illustrated in FIG. 23, and the viewer needs to speak the attribute information unique to the viewer (for example, account number "1234567890").

On the other hand, the service delivery parameter is inserted as an audio watermark in the second embodiment. Therefore, for example, the viewer checking the above-described speech instruction message 271 of FIG. 19 needs to simply speak only the wake word "Service A," and the viewer does not have to speak the attribute information unique to the viewer.

<3. Modifications>
(Another Example of Inserting Token)

Although the token is inserted as an audio watermark into the audio stream in the cases described above, the audio watermark is an example, and other methods may be used to embed the token. Here, for example, fingerprint (Finger Print) information that is a feature value extracted from the audio stream of content, such as a CM and a program, may be used to embed the token.

Note that the details of the audio watermark are illustrated in, for example, the following NPL 1 and NPL 2. NPL 1 and NPL 2 define the audio watermark in ATSC (Advanced Television Systems Committee) 3.0 that is one of the next-generation terrestrial broadcasting standards.

[NPL 1]

ATSC Standard: Audio Watermark Emission (A/334)

[NPL 2]

ATSC Standard: Content Recovery in Redistribution Scenarios (A/336)

(Examples of Application)

Although the application executed by the application execution environment 211 of the client apparatus 20 is a broadcasting application associated with broadcasting executed by a browser in the example described above, the application may be, for example, another application, such as a native application executed in an OS (Operating System) environment (presentation control environment).

In addition, the application is not limited to the application (application executed on the browser) developed in a markup language, such as HTML5 (HyperText Markup Language 5), or a script language, such as JavaScript (registered trademark), and the application may be, for example, an application developed in a programming language, such as Java (registered trademark).

Note that the application executed by the client apparatus 20 is not limited to the application acquired through broadcasting, and the application may be acquired from a server on the Internet 50 through communication. In addition, the content described above is not limited to the CM or the program, and for example, any content, such as music, video, electronic book, game, and advertisement, can be included. Furthermore, there can also be a case in which the CM or the program is all or part of a service or a channel.

(Hardware Configurations of Devices on Reception Side and Local Side)

Although the hardware configuration of the client apparatus 20 is not particularly described above, the hardware configuration can be, for example, as follows. In other words, the client apparatus 20 includes, for example, a television receiver, and therefore, the client apparatus 20 can include, for example, a CPU (Central Processing Unit), a memory, a tuner, a demultiplexer, a video decoder, a display, a communication I/F, and the like in addition to the audio decoder 201 and the audio speaker 202.

Furthermore, although the hardware configuration of the voice processing apparatus 30 is not particularly described, the hardware configuration can be, for example, as follows. In other words, the voice processing apparatus 30 includes, for example, a smart speaker, and therefore, the voice processing apparatus 30 can include, for example, a CPU, a memory, a speaker, a communication I/F, and the like in addition to the audio microphone 311.

Note that although the client apparatus 20 and the voice processing apparatus 30 are separate devices in the description above, the client apparatus 20 and the voice processing apparatus 30 may be an integrated device (combined device). For example, the function of the voice processing apparatus 30 can be provided as a voice processing module and included in the function of the client apparatus 20 to form a combined device.

In addition, it can also be stated that the server apparatus 10, the client apparatus 20, the voice processing apparatus 30, and the server apparatus 40 are information processing apparatuses.

In addition, although the client apparatus 20 is a fixed receiver, such as a television receiver, or a mobile receiver, such as a smartphone, in the description above, the client apparatus 20 may be a wearable computer, such as a head mounted display (HMD: Head Mounted Display). Furthermore, the client apparatus 20 can also be, for example, a device mounted on a car such as an on-board television, a set top box (STB: Set Top Box), a gaming device, or the like. In other words, the client apparatus 20 can be any device as long as the device can reproduce or record content.

(Example of Broadcasting Method)

Although the broadcasting method of the broadcasting system 11 is not particularly mentioned in the description above, examples of the broadcasting method that can be adopted include ATSC (particularly, ATSC 3.0) that is a method adopted in the U.S.A. and the like, ISDB (Integrated Services Digital Broadcasting) that is a method adopted in Japan and the like, and DVB (Digital Video Broadcasting)

that is a method adopted in countries in Europe and the like. In addition, the transmission path in the case of distribution through broadcasting may be terrestrial broadcasting, as well as satellite broadcasting using a broadcasting satellite (BS: Broadcasting Satellite), a communications satellite (CS: Communications Satellite), or the like and cable broadcasting such as a cable TV (CATV).

(Others)

The names used in the present specification are examples, and other names are actually used in some cases. However, the differences in names are just differences in form, and the details of the objects are not substantially different. For example, the wake word described above is called an activation keyword, a command word, or the like in some cases.

<4. Configuration of Computer>

The series of processes described above can be executed by hardware or can be executed by software. In the case where the series of processes are executed by software, a program included in the software is installed on a computer. FIG. 24 is a diagram illustrating a configuration example of hardware of the computer that uses a program to execute the series of processes described above.

In a computer 1000, a CPU (Central Processing Unit) 1001, a ROM (Read Only Memory) 1002, and a RAM (Random Access Memory) 1003 are connected to each other through a bus 1004. An input-output interface 1005 is also connected to the bus 1004. An input unit 1006, an output unit 1007, a recording unit 1008, a communication unit 1009, and a drive 1010 are connected to the input-output interface 1005.

The input unit 1006 includes a keyboard, a mouse, a microphone, and the like. The output unit 1007 includes a display, a speaker, and the like. The recording unit 1008 includes a hard disk, a non-volatile memory, and the like. The communication unit 1009 includes a network interface and the like. The drive 1010 drives a removable recording medium 1011, such as a magnetic disk, an optical disk, a magneto-optical disk, and a semiconductor memory.

In the computer 1000 configured in this way, the CPU 1001 loads a program recorded in the ROM 1002 or the recording unit 1008 on the RAM 1003 through the input-output interface 1005 and the bus 1004 and executes the program to execute the series of processes described above.

The program executed by the computer 1000 (CPU 1001) can be provided by recording the program in, for example, the removable recording medium 1011 as a package medium or the like. In addition, the program can also be provided through a wired or wireless transmission medium, such as a local area network, the Internet, and digital satellite broadcasting.

In the computer 1000, the removable recording medium 1011 can be mounted on the drive 1010 to install the program on the recording unit 1008 through the input-output interface 1005. In addition, the communication unit 1009 can receive the program through a wired or wireless transmission medium, and the program can be installed on the recording unit 1008. Furthermore, the program can be installed in advance on the ROM 1002 or the recording unit 1008.

Here, in the present specification, the processes executed by the computer according to the program may not be executed in chronological order described in the flow charts. In other words, the processes executed by the computer according to the program also include processes executed in parallel or executed individually (for example, parallel processing or processes using objects). In addition, the program may be processed by one computer (processor), or a plurality of computers may execute distributed processing of the program.

Note that the embodiments of the present technique are not limited to the embodiments described above, and various changes can be made without departing from the scope of the present technique.

In addition, the present technique can be configured as follows.

(1)

An information processing apparatus including:

an insertion unit that inserts a token into an audio stream of the content, the token being related to use of a voice AI assistance service in coordination with content.

(2)

The information processing apparatus according to (1), in which the token includes a token for prohibiting or permitting a voice recognition process of the audio stream of the content executed by the voice AI assistance service.

(3)

The information processing apparatus according to (1), in which the token includes a parameter delivered to the voice AI assistance service.

(4)

The information processing apparatus according to any one of (1) to (3), further including:

a generation unit that generates the token, in which the insertion unit inserts the token generated by the generation unit into an audio stream of content to be distributed.

(5)

The information processing apparatus according to (4), in which the insertion unit inserts, as an audio watermark, the token into the audio stream of the content to be distributed through broadcasting or through communication.

(6)

The information processing apparatus according to any one of (1) to (3), further including:

an execution unit that executes an application having a function of generating the token, in which the insertion unit inserts the token into an audio stream of content to be reproduced, the token being generated by the application in execution.

(7)

The information processing apparatus according to (6), in which the insertion unit inserts, as an audio watermark, the token into the audio stream of the content distributed through broadcasting or through communication, the token being generated by the application distributed through broadcasting or through communication.

(8)

The information processing apparatus according to (2), in which a side that detects the token inserted into the audio stream of the content is notified of the token in advance.

(9)

The information processing apparatus according to (3), in which the parameter is encrypted or is provided with a signature for detecting falsification.

(10)

An information processing method of an information processing apparatus, in which
the information processing apparatus inserts a token into an audio stream of the content, the token being related to use of a voice AI assistance service in coordination with content.

(11)

An information processing apparatus including:
a detection unit that detects, from an audio stream of content, a token related to use of a voice AI assistance service in coordination with the content.

(12)

The information processing apparatus according to (11), in which
the token includes a token for prohibiting a voice recognition process of the audio stream of the content executed by the voice AI assistance service.

(13)

The information processing apparatus according to (12), further including:
a voice recognition unit that executes the voice recognition process of the audio stream of the content, in which
the detection unit invalidates a voice recognition result obtained in the voice recognition process in a case where the token notified in advance is detected from the audio stream of the content.

(14)

The information processing apparatus according to (11), in which
the token includes a token for permitting the voice recognition process of the audio stream executed by the voice AI assistance service.

(15)

The information processing apparatus according to (14), further including:
a voice recognition unit that executes the voice recognition process of the audio stream of the content, in which
the detection unit delivers a voice recognition result obtained in the voice recognition process to a subsequent process in a case where the token notified in advance is detected from the audio stream of the content.

(16)

The information processing apparatus according to (11), in which
the token includes a parameter delivered to the voice AI assistance service.

(17)

The information processing apparatus according to (16), in which
the detection unit delivers the parameter to the subsequent process in a case where the parameter is detected from the audio stream of the content.

(18)

The information processing apparatus according to (16) or (17), in which
the detection unit detects the token inserted into the audio stream of the content in a case where a viewer viewing the content speaks a wake word of the voice AI assistance service.

(19)

The information processing apparatus according to any one of (11) to (18), further including:
a sound collection unit that collects voice of the content output from another information processing apparatus that reproduces the content distributed through broadcasting or through communication, in which
the detection unit detects the token inserted as an audio watermark into an audio stream of the voice of the content collected by the sound collection unit.

(20)

An information processing method of the information processing apparatus, in which
the information processing apparatus detects, from an audio stream of content, a token related to use of a voice AI assistance service in coordination with the content.

REFERENCE SIGNS LIST

1 Content/voice AI coordination system, 10, 10A, 10B, 10C, 10D Server apparatus, 11 Broadcasting system, 12 Online distribution system, 20, 20A, 20B, 20C, 20D Client apparatus, 30, 30A, 30B, 30C, 30D Voice processing apparatus, 40 Server apparatus, 50 Internet, 101 CM/program bank, 102 Audio decoder, 103 Token generator, 104 Audio WM insertion module, 105 Audio encoder, 111 Application generator, 201 Audio decoder, 202 Audio speaker, 211 Application execution environment, 212 Audio WM insertion module, 301 Sound collection module, 302 Audio WM detection module, 303 Voice recognition module, 311 Audio microphone, 1000 Computer, 1001 CPU

The invention claimed is:

1. An information processing apparatus comprising:
circuitry configured to
insert a voice recognition process token into an audio stream of a content, the voice recognition process token being related to use of a voice AI assistance service in coordination with the content, wherein
the voice recognition process token indicates whether a voice recognition process of the audio stream of the content executed by the voice AI assistance service is prohibited or permitted; and
a permitted voice recognition process operation is confirmed by a user inquiry token and a message presented to a user of the information processing apparatus in coordination with a response of the user;
wherein the user inquiry token is an audio watermark inserted into the audio stream of the voice of the content.

2. The information processing apparatus according to claim 1, wherein
the voice recognition process token includes a parameter delivered to the voice AI assistance service.

3. The information processing apparatus according to claim 1, wherein the circuitry is configured to:
generate the voice recognition process token, and insert the voice recognition process token generated into an audio stream of content to be distributed.

4. The information processing apparatus according to claim 3, wherein the circuitry is configured to
insert as an audio watermark, the voice recognition process token into the audio stream of the content to be distributed through broadcasting or through communication.

5. The information processing apparatus according to claim 1, wherein the circuitry is configured to:
execute an application which, when executed, generates the voice recognition process token, wherein the circuitry inserts the voice recognition process token into an audio stream of content to be reproduced, the voice recognition process token being generated by the application in execution.

6. The information processing apparatus according to claim 5, wherein the circuitry is configured to
insert, as an audio watermark, the voice recognition process token into the audio stream of the content distributed through broadcasting or through communication, the voice recognition process token being generated by the application distributed through broadcasting or through communication.

7. The information processing apparatus according to claim 1, wherein circuitry that detects the voice recognition process token inserted into the audio stream of the content is notified of the voice recognition process token in advance.

8. The information processing apparatus according to claim 2, wherein
the parameter is encrypted or is provided with a signature for detecting falsification.

9. An information processing method of an information processing apparatus, the method comprising
inserting, by circuitry of the information processing apparatus, a voice recognition process token into audio stream of content, the voice recognition process token being related to use of a voice AI assistance service in coordination with the content, wherein
the voice recognition process token indicates whether a voice recognition process of the audio stream of the content executed by the voice AI assistance service is prohibited or permitted; and
a permitted voice recognition process operation is confirmed by a user inquiry token and a message presented to a user of the information processing apparatus in coordination with a response of the user;
wherein the user inquiry token is an audio watermark inserted into the audio stream of the voice of the content.

10. An information processing apparatus comprising:
circuitry configured to detect, from an audio stream of content, a voice recognition process token related to use of a voice AI assistance service in coordination with the content, wherein
the voice recognition process token indicates whether a voice recognition process of the audio stream of the content executed by the voice AI assistance service is prohibited or permitted; and
a permitted voice recognition process operation is confirmed by a user inquiry token and a message presented to a user of the information processing apparatus in coordination with a response of the user;
wherein the user inquiry token is an audio watermark inserted into the audio stream of the voice of the content.

11. The information processing apparatus according to claim 10, wherein the circuitry is configured to
perform a voice recognition process of the audio stream of the content, wherein
a voice recognition result obtained in the voice recognition process is invalidated in a case where the voice recognition process token is detected from the audio stream of the content.

12. The information processing apparatus according to claim 10 wherein the voice recognition process token includes a voice recognition process token for permitting the voice recognition process of the audio stream executed by the voice AI assistance service.

13. The information processing apparatus according to claim 12, wherein the circuitry is configured to:
execute the voice recognition process of the audio stream of the content, and
deliver a voice recognition result obtained in the voice recognition process to a subsequent process in a case where the voice recognition process token notified in advance is detected from the audio stream of the content.

14. The information processing apparatus according to claim 10, wherein
the voice recognition process token includes a parameter delivered to the voice AI assistance service.

15. The information processing apparatus according to claim 14, wherein the circuitry is configured to
deliver the parameter to a subsequent process in a case where the parameter is detected from the audio stream of the content.

16. The information processing apparatus according to claim 15, wherein the circuitry is configured to
detect the voice recognition process token inserted into the audio stream of the content in a case where the viewer viewing the content speaks a wake word of the voice AI assistance service.

17. The information processing apparatus according to claim 10, wherein the circuitry is configured to
collect voice of content output from another information processing apparatus that reproduces the content distributed through broadcasting or through communication, and
detect a voice recognition process token inserted as an audio watermark into an audio stream of the voice of the content.

18. An information processing method of an information processing apparatus, the method comprising
detecting, from an audio stream of content, a voice response processing token related to use of a voice AI assistance service in coordination with the content, wherein
the voice response processing token indicates whether a voice recognition process of the audio stream of the content executed by the voice AI assistance service is prohibited or permitted; and
a permitted voice recognition process operation is confirmed by a user inquiry token and a message presented to a user of the information processing apparatus in coordination with a response of the user;
wherein the user inquiry token is an audio watermark inserted into the audio stream of the voice of the content.

19. The information processing apparatus according to claim 1, comprising a digital television.

20. The information processing apparatus according to claim 19 wherein the message presented to the user is an audio message output by the information processing apparatus.

21. The information processing apparatus according to claim 19 wherein the message presented to the user is a visual message displayed by the information processing apparatus.

22. The information processing apparatus according to claim 9, comprising a digital television.

23. The information processing apparatus according to claim 22 wherein the message presented to the user is an audio message output by the information processing apparatus.

24. The information processing apparatus according to claim 22 wherein the message presented to the user is a visual message displayed by the information processing apparatus.

25. The information processing apparatus according to claim 10, comprising a digital television.

26. The information processing apparatus according to claim 25 wherein the message presented to the user is an audio message output by the information processing apparatus.

27. The information processing apparatus according to claim 25 wherein the message presented to the user is a visual message displayed by the information processing apparatus.

28. The information processing apparatus according to claim 18, comprising a digital television.

29. The information processing apparatus according to claim 28 wherein the message presented to the user is an audio message output by the information processing apparatus.

30. The information processing apparatus according to claim 28 wherein the message presented to the user is a visual message displayed by the information processing apparatus.

* * * * *